(12) United States Patent
Mohebbi et al.

(10) Patent No.: US 12,540,850 B2
(45) Date of Patent: Feb. 3, 2026

(54) PREDICTIVE CALIBRATION SCHEDULING APPARATUS AND METHOD

(71) Applicant: Cymer, LLC, San Diego, CA (US)

(72) Inventors: Mohammad Taghi Mohebbi, San Diego, CA (US); Spencer Ryan Williams, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 437 days.

(21) Appl. No.: 18/005,220

(22) PCT Filed: Jul. 28, 2021

(86) PCT No.: PCT/US2021/043552
§ 371 (c)(1),
(2) Date: Jan. 12, 2023

(87) PCT Pub. No.: WO2022/039898
PCT Pub. Date: Feb. 24, 2022

(65) Prior Publication Data
US 2023/0266168 A1  Aug. 24, 2023

Related U.S. Application Data

(60) Provisional application No. 63/151,411, filed on Feb. 19, 2021, provisional application No. 63/066,888, filed on Aug. 18, 2020.

(51) Int. Cl.
*G01J 3/28* (2006.01)
*G01J 3/02* (2006.01)
(Continued)

(52) U.S. Cl.
CPC .............. *G01J 3/28* (2013.01); *G01J 3/0297* (2013.01); *G03F 7/70508* (2013.01);
(Continued)

(58) Field of Classification Search
None
See application file for complete search history.

(56) References Cited

U.S. PATENT DOCUMENTS

| | | | |
|---|---|---|---|
| 5,646,954 | A | 7/1997 | Das et al. |
| 5,978,391 | A | 11/1999 | Das et al. |

(Continued)

FOREIGN PATENT DOCUMENTS

| | | |
|---|---|---|
| EP | 1438774 A2 | 7/2004 |
| JP | 2003214949 A | 7/2003 |

(Continued)

OTHER PUBLICATIONS

European International Searching Authority, International Search Report and Written Opinion, counterpart PCT Application No. PCT/US2021/043552, mailed Nov. 11, 2021, 12 total pages.

*Primary Examiner* — Giovanni Astacio-Oquendo
*Assistant Examiner* — Carl F.R. Tchatchouang
(74) *Attorney, Agent, or Firm* — DiBerardino McGovern IP Group LLC

(57) ABSTRACT

A method is performed for scheduling a calibration relating to an optical device in a light source. The method can be performed by a calibration system including a calibration apparatus and a prediction controller. The method includes: receiving a property associated with the optical device while the optical device is being calibrated; calculating a current degradation metric based at least on the optical device property, the degradation metric modeling behavior of the optical device; estimating when a degradation of the optical device would exceed a threshold based on the current degradation metric; and scheduling a calibration of the optical device based at least in part on the estimate of optical device degradation.

30 Claims, 13 Drawing Sheets

(51) Int. Cl.
  *G03F 7/00* (2006.01)
  *H01S 3/00* (2006.01)
  *H01S 3/10* (2006.01)
  *H01S 3/225* (2006.01)

(52) U.S. Cl.
  CPC ...... *G03F 7/70516* (2013.01); *G03F 7/70575* (2013.01); *G03F 7/70591* (2013.01); *H01S 3/0014* (2013.01); *H01S 3/10069* (2013.01); *H01S 3/225* (2013.01); *G03F 7/70025* (2013.01)

(56) References Cited

U.S. PATENT DOCUMENTS

| | | | |
|---|---|---|---|
| 5,978,394 A | 11/1999 | Newman et al. | |
| 6,144,684 A * | 11/2000 | McMinn | H01S 5/4031 |
| | | | 372/50.12 |
| 6,807,205 B1 | 10/2004 | Albrecht et al. | |
| 9,983,060 B1 * | 5/2018 | Zhao | G03F 7/70516 |
| 10,288,484 B2 * | 5/2019 | Zhao | G03F 7/70575 |
| 2002/0141471 A1 | 10/2002 | Aab et al. | |
| 2007/0195836 A1 | 8/2007 | Dunstan et al. | |
| 2008/0082283 A1 | 4/2008 | Dixon et al. | |
| 2008/0086440 A1 | 4/2008 | Hoey et al. | |
| 2011/0205512 A1 | 8/2011 | Seong et al. | |
| 2013/0124126 A1 * | 5/2013 | Ahuja | G01K 15/00 |
| | | | 702/85 |
| 2013/0170508 A1 | 7/2013 | Suzuki et al. | |
| 2015/0204899 A1 | 7/2015 | Salit et al. | |
| 2015/0340837 A1 | 11/2015 | Matsunaga et al. | |
| 2015/0355025 A1 * | 12/2015 | Duffey | G03F 7/70041 |
| | | | 355/67 |
| 2019/0235481 A1 | 8/2019 | Takigawa et al. | |

FOREIGN PATENT DOCUMENTS

| | | |
|---|---|---|
| JP | 2009009955 A | 1/2009 |
| JP | 2016180987 A | 10/2016 |
| TW | 201129874 A | 9/2011 |
| TW | 202004353 A | 1/2020 |
| WO | 2003021728 A2 | 3/2003 |
| WO | 2008042572 A2 | 4/2008 |
| WO | 2013049584 A1 | 4/2013 |
| WO | 2019190700 A1 | 10/2019 |
| WO | 2021126520 A1 | 6/2021 |

* cited by examiner

PREDICTIVE CALIBRATION SCHEDULING APPARATUS AND METHOD

CROSS REFERENCE TO RELATED APPLICATIONS

This application claims priority to U.S. Application No. 63/066,888, filed Aug. 18, 2020, titled PREDICTIVE CALIBRATION SCHEDULING APPARATUS AND METHOD; and U.S. Application No. 63/151,411, filed Feb. 19, 2021, titled PREDICTIVE CALIBRATION SCHEDULING APPARATUS AND METHOD, both of which are incorporated herein in their entireties by reference.

TECHNICAL FIELD

The disclosed subject matter relates to an apparatus for predicting when to perform a calibration of an optical device in a light source.

BACKGROUND

One kind of gas discharge light source used in photolithography is termed an excimer light source or laser. Typically, an excimer laser uses a combination of one or more noble gases, which can include argon, krypton, or xenon, and a reactive gas, which can include fluorine or chlorine. The excimer laser can create an excimer, a pseudo-molecule, under appropriate conditions of electrical simulation (energy supplied) and high pressure (of the gas mixture), the excimer only existing in an energized state. The excimer in an energized state gives rise to amplified light in the ultraviolet range. An excimer light source can use a single gas discharge chamber or a plurality of gas discharge chambers. When the excimer light source is performing, the excimer light source produces a deep ultraviolet (DUV) light beam. DUV light can include wavelengths from, for example, about 100 nanometers (nm) to about 400 nm.

The DUV light beam can be directed to a photolithography exposure apparatus or scanner, which is a machine that applies a desired pattern onto a target portion of a substrate (such as a silicon wafer). The DUV light beam interacts with a projection optical system, which projects the DUV light beam through a mask onto the photoresist of the wafer. In this way, one or more layers of chip design is patterned onto the photoresist and the wafer is subsequently etched and cleaned.

SUMMARY

In some general aspects, a method is performed for scheduling a calibration relating to an optical device in a light source. The method includes: receiving a property associated with the optical device while the optical device is being calibrated; calculating a current degradation metric based at least on the optical device property, the degradation metric modeling behavior of the optical device; estimating when a degradation of the optical device would exceed a threshold based on the current degradation metric; and scheduling a calibration of the optical device based at least in part on the estimate of optical device degradation.

Implementations can include one or more of the following features. For example, the calibration of the optical device can be scheduled by determining when to perform a calibration of the optical device.

The current degradation metric can be calculated based on a calibration property.

The optical device can be configured to measure a spectral feature of a light beam produced by the light source. The measured spectral feature of the light beam can be a wavelength of the light beam.

The optical device property can be received by receiving an error measurement associated with a spectral feature of the light beam produced by the light source while the optical device is being calibrated. The error measurement can be a difference between a measured spectral feature of the light beam and a reference spectral feature.

The current degradation metric can be calculated by estimating how much the optical device property changes relative to a change in usage of the optical device. The estimate of how much the optical device property changes relative to the change in usage of the optical device can include estimating an error that is based on data related to a prior value of the optical device property and a prior degradation metric.

The current degradation metric can be calculated by assuming that the optical device property changes in a linear manner relative to a change in usage of the optical device. The current degradation metric can be calculated by estimating an error in the optical device property based on a linear function in which a prior degradation metric is a slope of the linear function, the linear function including a prior value of the usage of the optical device and a cumulative summation of the error in the optical device property. The current degradation metric can be calculated by estimating an error in the optical device property. The current degradation metric can be calculated by analyzing how the optical device property is trending.

The degradation metric can model trending behavior of the optical device.

The calibration of the optical device can be scheduled by probing whether the optical device property changes in a non-linear manner relative to a usage of the optical device. Probing whether the optical device property changes in a non-linear manner relative to the usage of the optical device can include analyzing a confidence in the current degradation metric.

The estimating when the degradation of the optical device would exceed a threshold can include estimating when an error in the optical device property associated with the optical device would exceed a threshold. The scheduling the calibration of the optical device based on the estimate can include estimating an amount of additional usage of the optical device that would be acceptable before requiring the calibration.

The method can include, after scheduling the calibration of the optical device, updating the optical device property associated with the optical device when the next calibration that is scheduled is performed and assigning the current degradation metric to a prior degradation metric.

The degradation metric can correspond to a local linear approximation of the slope of the optical device property.

The optical device can be configured to estimate an energy of a light beam produced by the light source. The optical device property can be received while the optical device is being calibrated by receiving a measurement scale associated with the optical device performing a conversion from a direct measurement to an indirect value, the direct measurement relating to the light beam produced by the light source while the optical device is being calibrated. The degradation of the optical device can be estimated to exceed the threshold be estimating when a drift in the optical device property exceeds a drift threshold. The drift in the optical device property can be estimated to exceed the drift threshold by calculating the drift threshold based on an error threshold associated with indirect value.

In other general aspects, a calibration system includes: a calibration apparatus configured to calibrate an optical device configured to measure an aspect relating to a light beam produced by a light source; and a prediction controller in communication with the calibration apparatus. The prediction controller includes: an input module, an adaptive module, and an output module. The input module is configured to receive from the optical device a measured property associated with the measured aspect of the light beam while the optical device is being calibrated. The adaptive module is configured to: receive the measured property from the input module; calculate a current degradation metric based at least on the measured property, the degradation metric modeling behavior of the optical device; and estimate when a degradation of the optical device would exceed a threshold based on the current degradation metric. The output module is configured to schedule a calibration of the optical device based on the estimate from the adaptive module; and instruct the calibration apparatus to calibrate the optical device based on the schedule.

Implementations can include one or more of the following features. For example, the measured property associated with the optical device can include a measurement of a spectral feature of a light beam produced by the light source.

The calibration apparatus can include a calibration material having an optical transition profile with a known energy transition. The optical device can include a spectral analysis module configured to sense a spectral profile of a light beam produced by a light source, and the calibration apparatus can be configured to calibrate the spectral analysis module using the calibration material. The estimate of the degradation of the optical device can be an indication of a drift in the calibration of the spectral analysis module. The calibration apparatus being configured to calibrate the optical device can include adjusting one or more operating parameters of the spectral analysis module.

The degradation metric can correspond to a local linear approximation of the slope of a trend of the measured property.

In other general aspects, a prediction apparatus is in communication with a calibration apparatus configured to calibrate an optical device configured to measure an aspect relating to a light beam produced by a light source. The prediction apparatus includes: an input module configured to receive from the optical device a measured property associated with the measured aspect of the light beam while the optical device is being calibrated; an adaptive module configured to: receive the measured property from the input module; calculate a current degradation metric based at least on the measured property, the degradation metric modeling behavior of the optical device; and estimate when a degradation of the optical device would exceed a threshold based on the current degradation metric; and an output module configured to schedule a calibration of the optical device based on the estimate from the adaptive module; and instruct the calibration apparatus to calibrate the optical device based on the schedule.

In other general aspects, a calibration system includes: a calibration apparatus configured to calibrate an optical device configured to measure an aspect relating to a light beam produced by a light source; and a prediction controller in communication with the calibration apparatus. The prediction controller includes: an input module configured to receive from the optical device a property associated with the optical device while the optical device is being calibrated; an adaptive module configured to: receive the optical device property from the input module; calculate a current degradation metric based at least on the optical device property, the degradation metric modeling behavior of the optical device; and estimate when a degradation of the optical device would exceed a threshold based on the current degradation metric; and an output module configured to schedule a calibration of the optical device based on the estimate from the adaptive module; and instruct the calibration apparatus to calibrate the optical device based on the schedule.

Implementations an include one or more of the following features. For example, the optical device can be configured to provide an estimate of an energy of the light beam based on a measurement scale. The optical device property can include the measurement scale. The measurement scale can enable a conversion from a direct measurement of characteristic of the light beam to an indirect value of the energy of the light beam.

The calibration apparatus can include: a power meter that receives at least a portion of the light beam that is directed to the optical device, the power meter outputting a measured power; and a processor. The processor is configured to accurately calculate an energy in a pulse of the light beam based on a pulse repetition rate of the light source and the measured power output from the power meter, and compare the accurately calculated energy with the estimated energy of the light beam from the optical device. The processor can be configured to estimate a drift in the measurement scale of the optical device based on the comparison. The calibration apparatus being configured to calibrate the optical device can include adjusting the measurement scale of the optical device based on the comparison. The degradation of the optical device can be indicated by the estimate of the drift in the measurement scale of the optical device. The degradation metric can correspond to a local linear approximation of the slope of a trend of the measurement scale of the optical device.

In other general aspects, a prediction apparatus in communication with a calibration apparatus is configured to calibrate an optical device configured to measure an aspect relating to a light beam produced by a light source. The prediction apparatus includes: an input module configured to receive from the optical device a property associated with the optical device while the optical device is being calibrated; an adaptive module configured to: receive the optical device property from the input module; calculate a current degradation metric based at least on the optical device property, the degradation metric modeling behavior of the optical device; and estimate when a degradation of the optical device would exceed a threshold based on the current degradation metric; and an output module configured to schedule a calibration of the optical device based on the estimate from the adaptive module; and instruct the calibration apparatus to calibrate the optical device based on the schedule.

DESCRIPTION

Figure 1:
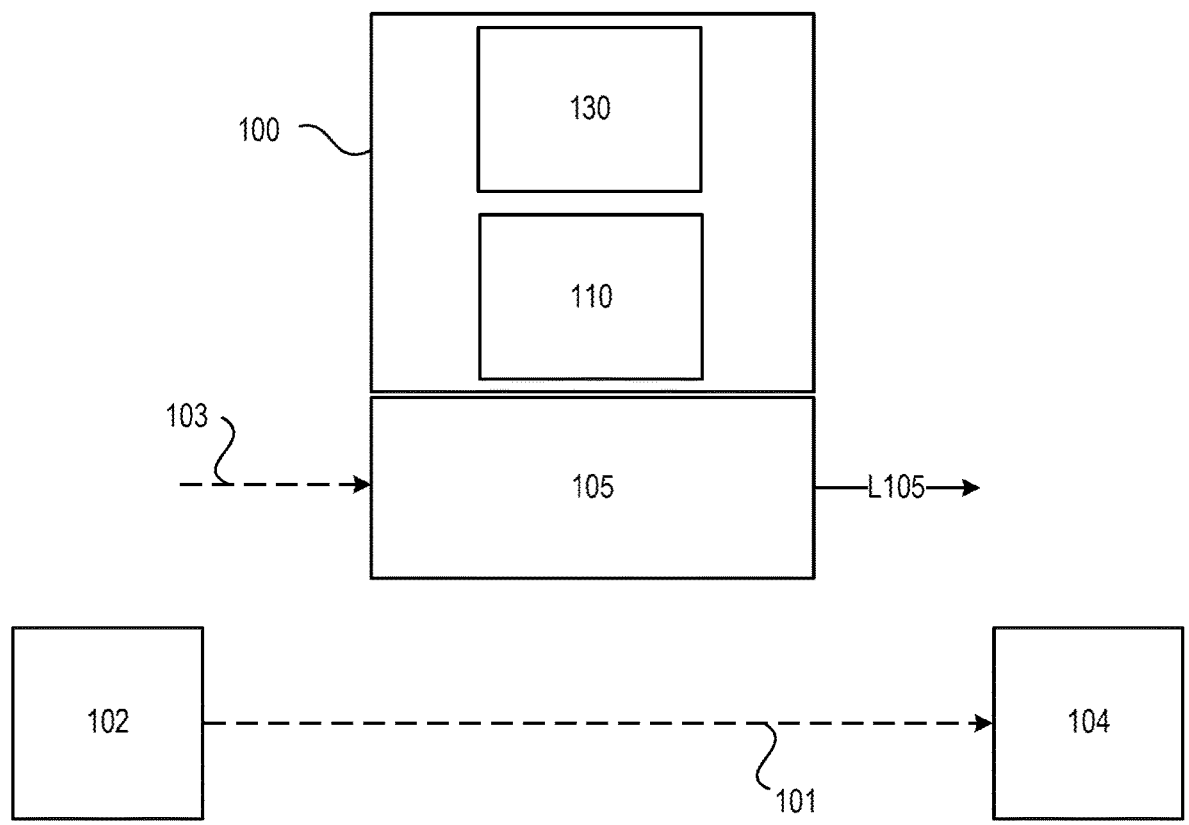
FIG. 1 is a block diagram of an optical device, a light source that produces a light beam, and calibration system that includes a calibration apparatus and a prediction controller.

Referring to FIG. 1, a calibration system 100 is arranged relative to an optical device 105. The optical device 105 is configured to measure or sense an aspect L105 relating to a light beam 101 produced by a light source 102, the light beam 101 being provided to and used by an output device 104. The measured or sensed aspect L105 related to the light beam 101 can be provided to the light source 102, the output device 104, or to a control apparatus associated with one or more of the light source 102 and the output device 104. The optical device 105 receives a diagnostic light beam 103, which can be the light beam 101 or a portion of the light beam 101 that has been split off from the light beam 101.

During operation, because of various unwanted effects, the accuracy of the measurement performed by the optical device 105 can deteriorate as the optical device 105 is being used. For example, the optical device 105 can rely on an optical path length experienced by the diagnostic light beam 103 within the optical device 105 in order to measure a spectral feature (such as a center wavelength) of an optical spectrum of the light beam 101. The measured aspect L105 can correspond to this measured spectral feature. The optical path length is related not only to a geometric length of the path followed by the diagnostic light beam 103 through the optical device 105, but also to the refractive index of the medium or media through which the diagnostic light beam 103 propagates. With usage, the optical path length within the optical device 105 can change, and these changes can be due to changes in any one or more of the refractive index and the geometric path length. Changes in the optical path length experienced by the diagnostic light beam 103 cause errors in the measurement of the spectral feature of the diagnostic light beam 103 performed by the optical device 105. This, in turn, makes it difficult to control the spectral features and optical spectrum of the light beam 101, which the output device 104 may require.

In order to maintain the accuracy of the measurements performed by the optical device 105, the optical device 105 must be properly calibrated. To this end, the calibration system 100 includes a calibration apparatus 110 configured to calibrate the optical device 105. During calibration, one or more operating parameters of the optical device 105 are adjusted to compensate for this deterioration in the optical device 105 due to use. Calibration of the optical device 105 can take several seconds or more than a minute. For example, calibration can take one minute, two minutes, or even five minutes. Moreover, during calibration, the light beam 101 is not available for use by the output device 104. Thus, operating time of the output device 104 is halted in order to perform the calibration.

In the past, the calibration apparatus 110 initiates a calibration of the optical device 105 based solely on a pre-set value of the usage of the optical device 105. For example, if the light source 102 is a pulsed light source that produces pulses of the light beam 101, then the usage of the optical device 105 can be determined by a total number of pulses of the light beam 101, and thus a total number of pulses of the diagnostic light beam 103 that is sensed by the optical device 105. Thus, in prior calibration systems, the calibration apparatus 110 could perform a calibration every X number pulses of the light beam 101. In some cases, the value of X could be on the order of hundreds of millions. For example, for some light sources 102, the calibration apparatus would perform a calibration of the optical device 105 every 300 million pulses of the light beam 101.

Initiating calibration based solely on a pre-configured or pre-determined value of the usage of the optical device 105 can lead to performing a calibration on the optical device 105 when one is not necessary or failing to perform a calibration on the optical device 105 when one is necessary.

Performing unnecessary calibrations of the optical device 105 means excessive and unwanted downtime for the output device 104. On the other hand, failing to perform a calibration on the optical device 105 when one is needed means that the light beam 101 may be operating out of specification required by the output device 104.

Thus, the calibration system 100 includes a prediction controller 130 in communication with the calibration apparatus 110 and the optical device 105. The prediction controller 130 is configured to schedule calibrations of the optical device 105 when calibrations are needed and not when calibrations are not needed. Moreover, the prediction controller 130 determines the calibration schedule during operation of the optical device 105, and not solely based on pre-set values of usage of the optical device 105. The prediction controller 130 makes the determination regarding whether and when to calibrate based on prior or past performance of the optical device 105. The prediction controller 130 determines when to schedule the subsequent or next calibration of the optical device 105 in between calibrations of the optical device 105 and in real time during operation of the light source 102.

In the drawings, solid lines connecting two elements indicate a data path over which data (for example, information and/or command signals) can flow. Data can flow over a wireless or a wired connection. Thus, the data that flows between the prediction controller 130, the calibration apparatus 110, and the optical device 105, or data that flows within each of these components can be over a wireless or wired connection. Moreover, dashed lines indicate an optical path along which light can propagate.

Figure 2:
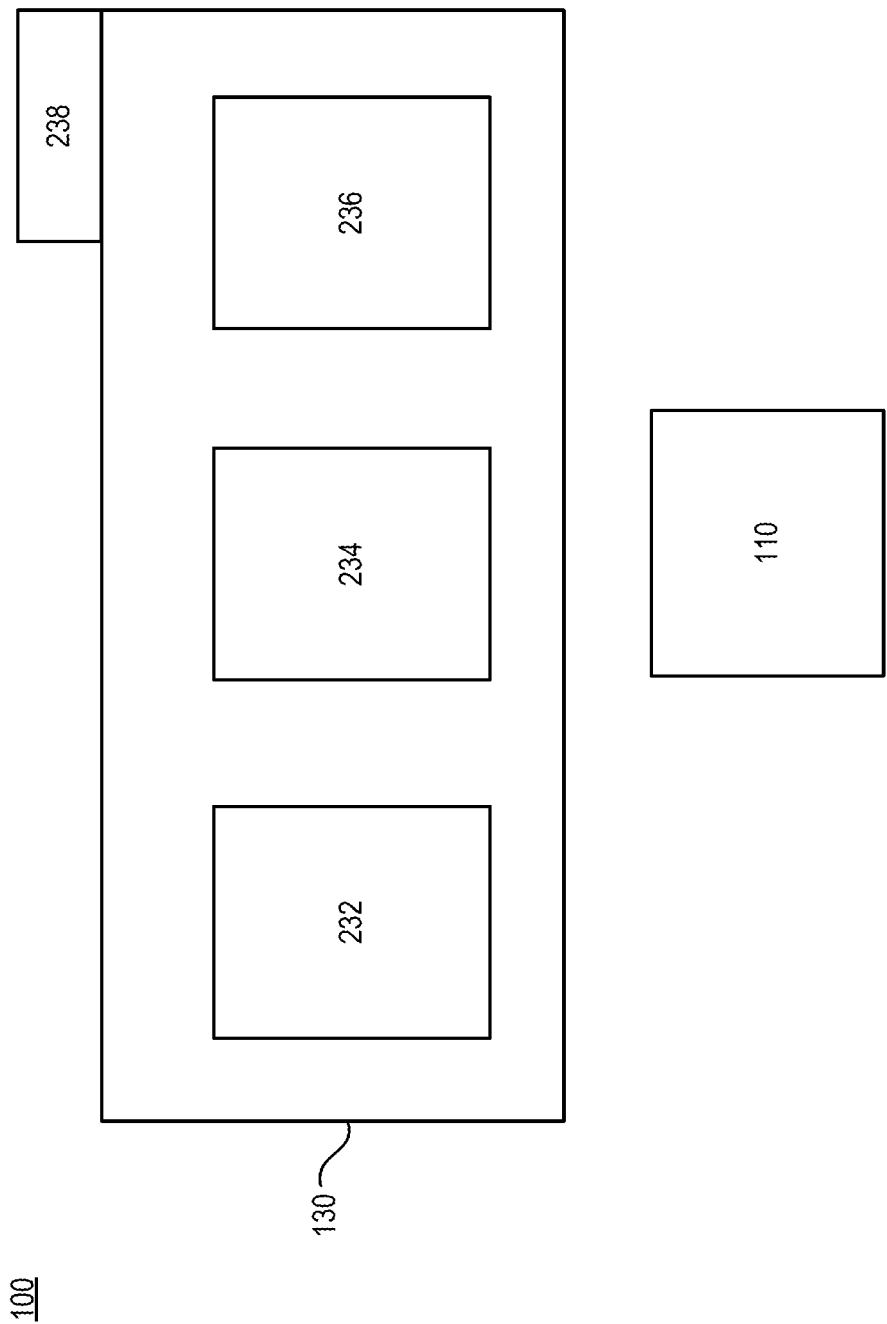
FIG. 2 is a block diagram of an implementation of the calibration system of FIG. 1 including the calibration apparatus and an implementation of the prediction controller that includes an input module, an adaptive module, and an output module.

To this end, with additional reference to FIG. 2, the prediction controller 130 includes an input module 232, an adaptive module 234, and an output module 236. In further implementations, the prediction controller 130 can include or can access memory 238. The memory 238 can be configured to store values of the measured property each time the measured property is received at the input module 232. The memory 238 can be configured to store the output instructions with the calibration schedule from the output module 236, other information from the optical device 105, or even the degradation metric from the adaptive module 234, such information being available for various use by the prediction controller 130 during operation. The memory 238 can be read-only memory and/or random-access memory and can provide a storage device suitable for tangibly embodying computer program instructions and data.

The input module 232 is in communication with the optical device 105 to receive information relating to prior or past performance of the optical device 105. In general, and as discussed in greater detail below, the input module 232 is configured to receive a measured property associated with the measured aspect of the diagnostic light beam 103 from the optical device 105. The adaptive module 234 is configured to receive the measured property from the input module 232 and estimate, based on the measured property, when a degradation of the optical device 105 would exceed a threshold. Additionally, the adaptive module 234 can estimate when the degradation of the optical device 105 would exceed a threshold based not only on the current measured property but also on prior measured properties. For example, the adaptive module 234 can estimate when the degradation of the optical device 105 would exceed a threshold based on a cumulative sum of the current measured property and all or some prior measured properties, such cumulative sum being stored in the memory 238. The output module 236 is configured to schedule the calibration of the optical device 105 based on the estimate from the adaptive module 234.

The prediction controller 130 can include or have access to one or more programmable processors and can each execute a program of instructions to perform desired functions including receiving the measured property from the optical device 105 and generating the output instructions to the calibration apparatus 110 that include the calibration schedule. The prediction controller 130 (and any one of the modules 232, 234, 236) can be implemented in any of digital electronic circuitry, computer hardware, firmware, or software. The calibration apparatus 110 can also include one or more input devices and one or more output devices.

Figure 3:
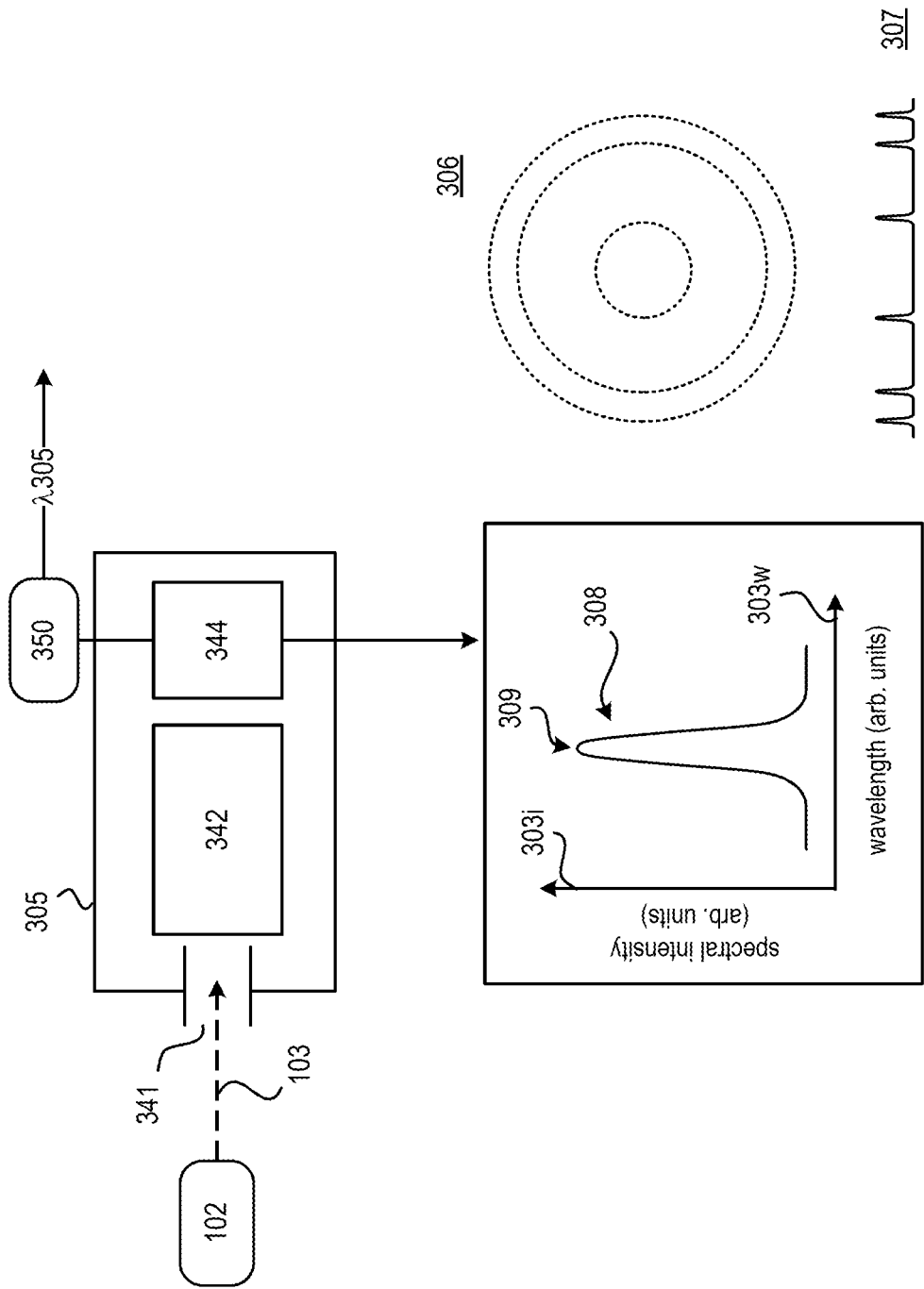
FIG. 3 is a block diagram of an implementation of the optical device of FIG. 1 that is a spectral analysis module that includes an optical separation apparatus and is configured to sense a spectral feature of the light beam produce by the light source of FIG. 1.

Referring to FIG. 3, in some implementations, the optical device 105 is a spectral analysis module 305. The spectral analysis module 305 includes an optical separation apparatus 342 and a sensor 344. In other implementations, the spectral analysis module 305 includes other components not shown, such as one or more of diffusers, windows, and reflective or refractive optical components. An implementation of the optical separation apparatus 342 is described below with reference to FIG. 4.

In the example of FIG. 3, the measured property associated with the spectral analysis module 305 includes a measurement of a spectral feature of the diagnostic light beam 103 that is produced by the light source 102. The spectral analysis module 305 is configured to sense the spectral feature of the diagnostic light beam 103 by sensing and analyzing a spectral profile 308 of the diagnostic light beam 103. The spectral profile 308, which is also referred to as an optical spectrum, is a spectral shape or intensity spectrum of the diagnostic light beam 103 (and the light beam 101) as a function of the wavelength (or frequency) of the diagnostic light beam 103. Thus, the spectral profile 308 contains information about how the optical energy or power of the light beam 101 or 103 is distributed over different wavelengths (or frequencies).

The diagnostic light beam 103 is directed through an aperture 341 of the spectral analysis module 305 to the optical separation apparatus 342. The diagnostic light beam 103 travels along an optical path that is defined by an optical path length within the optical separation apparatus 342. The optical separation apparatus 342 interacts with the diagnostic light beam 103 and outputs a plurality of spatial components 306 that correspond to the spectral components of the diagnostic light beam 103. The spectral components are in the spectral profile 308 of the light beam 103. In operation, the spectral analysis module 305 can generate the spectral profile 308 by changing the wavelength of the light beam 103 and scanning over a certain range of wavelengths.

The spectral components correspond to how the values of the optical energy or power, shown as a spectral intensity $303i$, of the light beam 103 are distributed over the different wavelengths $303w$. The spatial components 306 correspond to the values of the spectral intensity $303i$ mapped into a two dimensional space. In this way, the optical separation apparatus 342 transforms the spectral information, such as the wavelength, of the light beam 103 into spatial information that can be sensed or detected by the sensor 344. The transformation maps the spectral information to different positions in space such that the spectral information can be observed by the sensor 344. The transmission of the optical separation apparatus 342 is shown in a fringe pattern 307, which produces the spectral profile 308.

The sensor 344 receives and senses the output spatial components 306. The sensor can be defined by a plane that indicates generally the active area of its sensing region. The plane of the sensing region can be perpendicular to the direction of propagation of the spatial components 306. The sensor 344 can be a detector that receives and senses the output spatial components 306. For example, one type of suitable detector that can be used to measure along one dimension is a linear photodiode array. The linear photodiode array consists of multiple elements of the same size, formed in a linear arrangement at an equal spacing in one package. The photodiode array is sensitive to the wavelength of the light beam 103, and if the light beam 103 has a wavelength in the deep ultraviolet range, then the photodiode array is sensitive to light having a wavelength in the deep ultraviolet range. As another example, the sensor 344 can be a two dimensional sensor such as a two-dimensional charged coupled device (CCD) or a two-dimensional complementary metal oxide semiconductor (CMOS) sensor. The sensor 344 is able to read out data at a fast enough rate, for example, at about 6 kHz.

The output of the sensor 344 is connected to a control module 350 that measures a property of the spatial components 306 and analyzes the measured properties to calculate an estimate of the spectral feature of the light beam 103. As discussed above, the spectral feature estimate of the diagnostic light beam 103 and the light beam 101 is provided to the light source 102, the output device 104, or to a control apparatus associated with one or more of the light source 102 and the output device 104. The control module 350 can be connected to the sensor 344 through a data connection and can also be in communication with the light source 102 and/or the output device 104. The control module 350 can perform the measurement, analysis, and calculation for each pulse of the light beam 103 or for a set of pulses of the light beam. The control module 350 can also be connected to the calibration apparatus 110 and the prediction controller 130 of the calibration system 100 (FIGS. 1 and 2). The control module 350 can send data of the measured properties (including the analysis of the measured properties) of the light beam 103 to the calibration apparatus 110 and the prediction controller 130 through a data connection.

In the example of FIG. 3, the calculated estimate of the spectral property is a wavelength $\lambda 305$ of the light beam 103. The estimated wavelength $\lambda 305$ can correspond to or be based on a center wavelength 309 of the spectral profile 308 of the light beam 103. During operation, the optical separation apparatus 342 of the spectral analysis module 305 senses or measures aspects of the spectral profile 308 including the center wavelength 309. The value of the estimated wavelength $\lambda 305$ of the light beam 103 can be based on this measured center wavelength 309, and the center wavelength 309 depends on a measurement relating to the spatial components 306 that are sensed by the sensor 344 as well as a calibrated model of the optical path length of the optical separation apparatus 342. For example, the center wavelength 309 depends on a diameter of the rings visible in the spatial components 306 and the optical path length of the optical separation apparatus 342. With usage, that is, during operation of the spectral analysis module 305, the optical path length within the optical separation apparatus 342 can change due to changes in any one or more of the refractive index and the geometric path length. And, because the measurement of the spectral feature of the diagnostic light beam 103 is dependent on an accurate model of the optical path length of the optical separation apparatus 342, the changed optical path length experienced by the diagnostic light beam 103 can cause errors in the measurement of the spectral feature, including the center wavelength 309 of the spectral profile 308, of the diagnostic light beam 103 performed by the spectral analysis module 305.

Referring also to FIG. 2, the calibration system 100 can communicate with the spectral analysis module 305 during operation to calibrate the spectral analysis module 305, thereby compensating for the deterioration of the spectral analysis module 305 due to use. Specifically, the calibration apparatus 110 calibrates the spectral analysis module 305 (that is the optical device in the example of FIG. 3) by adjusting one or more operating parameters of the spectral analysis module 305. For example, the calibration apparatus 110 can adjust any one or more of software parameters, control parameters, and physical parameters of the spectral analysis module 305. In some implementations, the calibration apparatus 110 calibrates the spectral analysis module 305 by correcting or updating the model of the optical path length that the control module 350 within the spectral analysis module 305 uses to estimate the wavelength $\lambda 305$ of the diagnostic light beam 103.

The prediction controller 130 schedules calibrations of the spectral analysis module 305. Therefore, the prediction controller 130 (by way of the output module 236) sends instructions to the calibration apparatus 110 regarding whether to and when to perform the next or subsequent calibration, of the spectral analysis module 305. The prediction controller 130 determines when a calibration is needed and also determines when a calibration is not needed.

Figure 4:
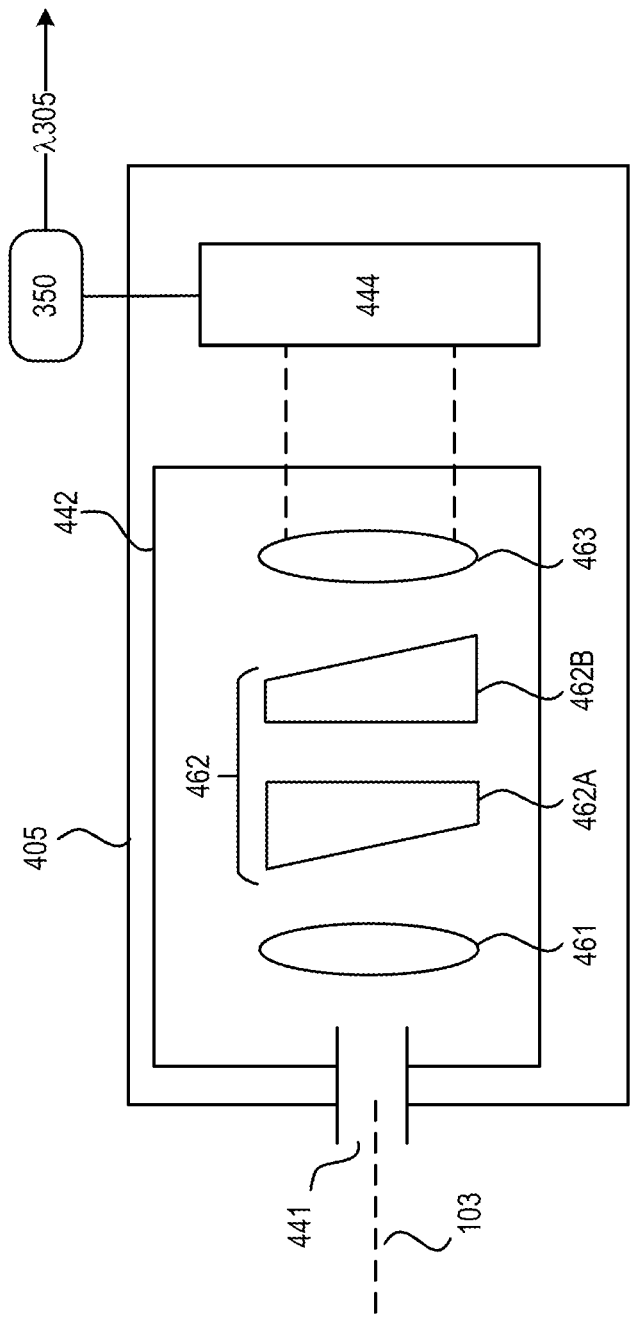
FIG. 4 is a block diagram of an implementation of the spectral analysis module of FIG. 3 that includes an implementation of the optical separation apparatus of FIG. 3.

Referring to FIG. 4, an implementation 405 of the spectral analysis module 305 includes an optical separation apparatus 442 and a sensor 444. The optical separation apparatus 442 is an implementation of the optical separation apparatus 342 (FIG. 3), and the sensor 444 is an implementation of the sensor 344 (FIG. 3). In the illustrated implementation, the optical separation apparatus 442 includes an input lens 461, an optical frequency separation apparatus that is an etalon 462, and an output lens 463. Other arrangements are used in other implementations. An aperture 441 of the spectral analysis module 405 provides a mechanism for inputting the diagnostic light beam 103. The aperture 441 can be placed at a focal plane of the input lens 461. By locating the aperture 441 of the spectral analysis module 440 at the focal plane of the input lens 461, each point from the focal plane acts as a point source and, accordingly, the input lens 461 acts to collimate the diagnostic light beam 103 before entering the etalon 462. The output lens 463 is positioned at the exit of the etalon 462 such that the focal plane of the output lens 463 overlaps the active area of the sensor 444.

The etalon 462 includes a pair of partially reflective glass or optical flats 462A, 462B, which can be spaced a short distance (for example, millimeters to centimeters) apart with the reflective surfaces facing each other. In other implementations, the etalon 462 includes a single plate with two parallel reflecting surfaces. The flats 462A, 462B can be made in a wedge shape to prevent the rear surfaces from producing interference fringes. The rear surfaces can also have an anti-reflective coating. As the light beam 103 passes through the paired flats 462A, 462B, the light beam 103 is multiply reflected, and produces a plurality of transmitted rays, which are collected by the output lens 463 and brought to the active region of the sensor 444. The spectral analysis module 405 can also include an optical relay between the output lens 463 and the sensor 444 to ensure that the sensor 444 is at the focal plane of the output lens 463.

The etalon 462 interacts with the light beam 103 and outputs the plurality of spatial components (such as the spatial components 306 of FIG. 3) that correspond to the spectral components of the light beam 103. The etalon 462 transforms the spectral information including the wavelength of the light beam 103 into spatial information that is sensed or detected by the sensor 444. The spatial components produced by the etalon 462 are an interference pattern that appear as a set of concentric rings (such as the spatial components 306). When the intensity distribution of the light beam 103 on the aperture 441 is more uniform, the interference pattern includes a more uniform intensity distribution. Specifically, the sharpness of the rings depends on the reflectivity of the flats 462A, 462B of the etalon 462. Thus, when the reflectivity of the flats 462A, 462B is high and the light beam 103 is a monochromatic light beam, the etalon 462 produces a set of narrow, bright rings against a dark background. The transmission of the etalon 462 as a function of wavelength is a fringe pattern (such as the fringe pattern 307 of FIG. 3) which produces a spectral profile (such as the spectral profile 308 of FIG. 3) of the light beam 103.

The sensor 444 receives and senses the output spatial components. The control module 350 receives the sensed spatial components from the sensor 444, and measure and/or analyze the received data. The control module 350 sends the measured and/or analyzed data (such as the estimated wavelength λ305) to the calibration system 100 (FIG. 1). The calibration system 100 calibrates the spectral analysis module 405 at scheduled times and predicts next or subsequent calibrations of the spectral analysis module 405 based at least in part on this measured and/or analyzed data. The calibration system can calibrate the spectral analysis module 405 by adjusting one or more operating parameters such as software parameters, control parameters, and physical parameters of the spectral analysis module 305. As an example, the model of the optical path length of the etalon 462 can be adjusted. As another example, a position of each of the flats 462A, 462B of the etalon 462 can be adjusted to adjust the optical path length of the light beam 103 within the etalon 462. In this way, the calibration system 100 corrects the optical path length experienced by the diagnostic light beam 103 in the spectral analysis module 405. Moreover, because the calibration system 100 also predicts the next or subsequent calibration (thereby reducing the amount of calibrations performed as compared to past methods), the duration of time in which the spectral analysis module 405 can operate is increased since there are fewer calibrations performed on the spectral analysis module 405.

Figure 5:
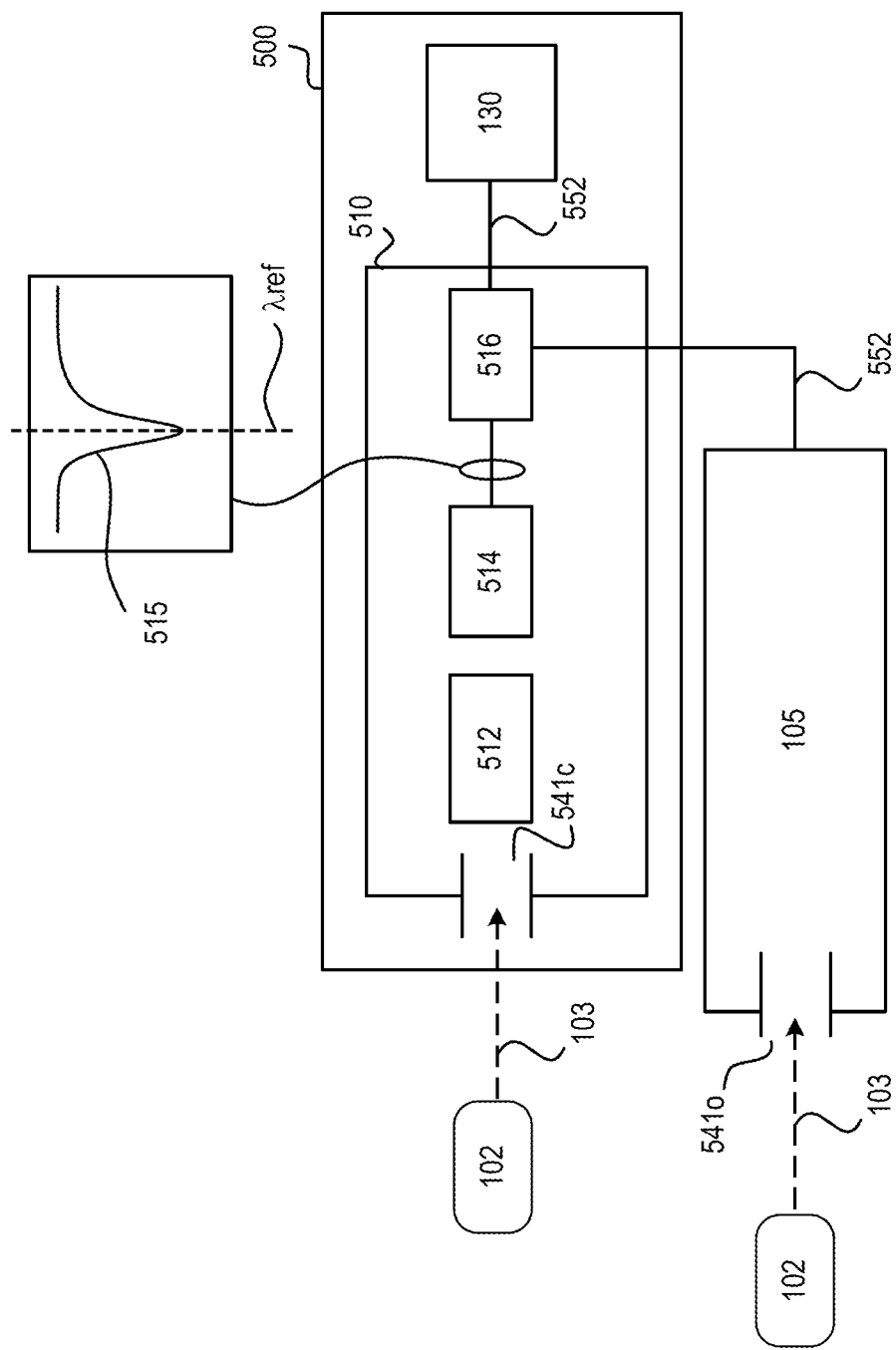
FIG. 5 is a block diagram of the optical device, the light source, and an implementation of the calibration system of FIG. 1, the implementation of the calibration system including the prediction controller and an implementation of the calibration apparatus of FIG. 1.

Referring to FIG. 5, an implementation 500 of the calibration system 100 includes the prediction controller 130 (FIG. 1) and an implementation 510 of the calibration apparatus 110 (FIG. 1). The optical device 105 (FIG. 1) is arranged relative to the calibration system 500 and includes an aperture 5410 through which the optical device 105 receives the diagnostic light beam 103 from the light source 102. The calibration apparatus 510 includes an aperture 541c, a calibration material 512, at least one detector 514, and a calibration control module 516. The calibration material 512 is a known material having an optical transition profile with a known energy transition. In other implementations, the calibration apparatus 510 can include more components than those shown in FIG. 5. The calibration control module 516 communicates with the detector 514, the optical device 105, and the prediction controller 130 through one or more data connections 552, each of which can be wired or wireless.

The calibration apparatus 510 receives the diagnostic light beam 103 from the light source 102 through the aperture 541c. The diagnostic light beam 103 interacts with the calibration material 512 to produce a transition (for example, absorption) profile 515 of the energy transition of the material 512, and the detector 514 detects this transition profile 515. The transition profile 515 shows the relationship between a characteristic associated with the interaction between the diagnostic light beam 103 and the material 512, and the wavelength of the diagnostic light beam 103. Thus, the transition profile 515 is displayed as a graph of the characteristic (measured by the detector 514) versus the wavelength of the diagnostic light beam 103. In order to detect the transition profile 515, the wavelength of the diagnostic light beam 103 is scanned across the energy transition.

The calibration material 512 can be made of any material that has a known energy transition that coincides with the wavelength range of the diagnostic light beam 103 (and also the light beam 101). Thus, if the light beam 103 has a wavelength in the deep ultraviolet range (DUV) range, then the material 512 is selected and the known energy transition is selected to be in the same DUV range. In some implementations in which the light beam 101 and the diagnostic light beam 103 have a wavelength in the DUV range, the material 512 is platinum that has a known transition having a peak absorption value λref of 193.4 nanometers (nm). The known energy transition that is monitored within the material 512 can be an electron transition, a vibrational transition, or a rotational transition. These energy transitions are due to the fact that the particles (such as atoms or molecules) within the material 512 take on certain discrete values of energy called energy levels. The term "energy levels" is used for the energy levels of electrons in atoms, ions, or molecules, which are bound by the electric field of the nucleus. Alternatively, the term "energy levels" can refer to energy levels of nuclei or vibrational or rotational energy levels in molecules.

The material 512 can be inside a vapor cell or enclosure. In some implementations, the material 512 is produced as a discharge plasma and is a part of a laser galvatron, which is an opto-galvanic sensor that takes advantage of the resonance phenomenon between the discharge plasma of the material 512 and the light beam 103. This is discussed in greater detail with reference to FIG. 6 next.

Figure 6:
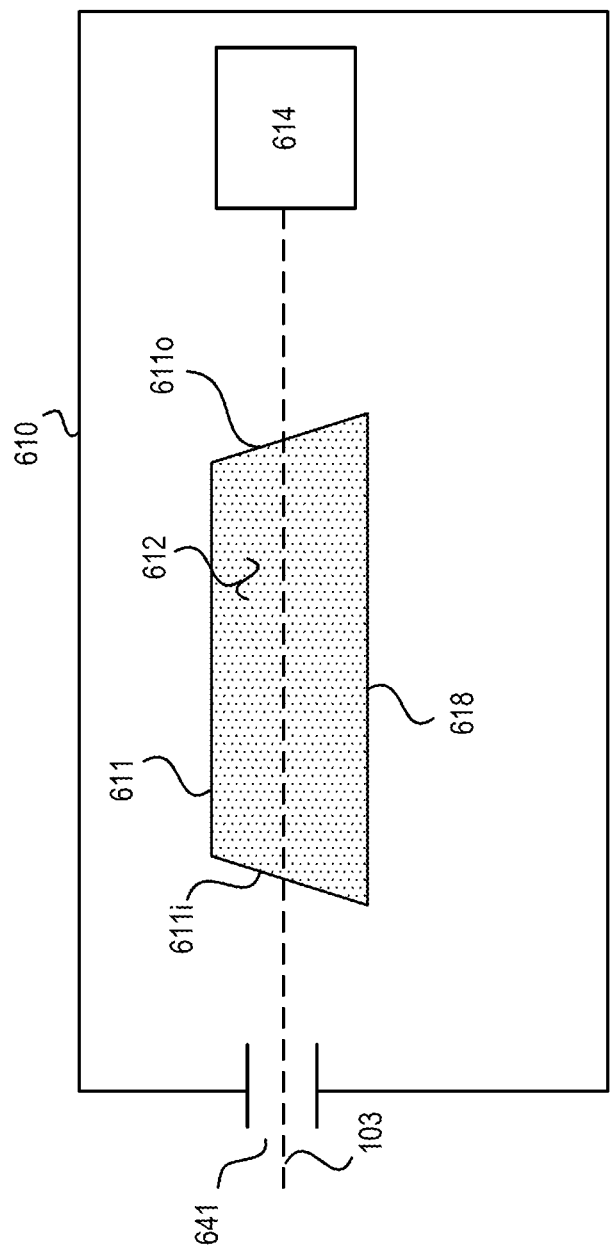
FIG. 6 is an implementation of the calibration apparatus of FIG. 5 that includes a detector and a cell that holds a calibration material.

Referring to FIG. 6, an implementation 610 of the calibration apparatus 510 includes an aperture 641, a cell 618 that holds a calibration material 612, and a detector 614. The light beam 103 is directed into the calibration apparatus 510 through the aperture 641. The cell 618 is defined by a wall 611 that is made of a rigid and chemically inert substance and is closed to thereby define the cavity in which the calibration material 612 is housed and retained. The substance of the wall 611 does not interact with the material 612 or the light beam 103. Moreover, the cell 618 includes at least an input window 611i and an output window 611o through which the diagnostic light beam 103 can pass. The cell 618 is sealed from the external environment (due to the design of the wall 611) in order to contain the material 612 within the cavity defined by the wall 611. The detector 614 is configured to detect the characteristic associated with the interaction between the material 612 and the diagnostic light beam 103 as the diagnostic light beam 103 is directed through the material 612 and while the wavelength of the diagnostic light beam 103 is scanned across the known energy transition.

In some implementations, the calibration apparatus 610 operates using principles of optical spectroscopy. In these implementations, the detector 614 is an optical detector such as a photodiode detector or a photomultiplier tube that measures an intensity of the diagnostic light beam 103 that has passed through the material 612. This measurement corresponds to the transition profile 515 (FIG. 5).

In other implementations, the calibration apparatus 610 can operate as a galvatron in which the material 612 is a gas or plasma discharge (produced from an electrode) that is made of the material 612 and placed within the cell 618. In some implementations, opto-galvanic spectroscopy can be used. In opto-galvanic spectroscopy, the current passing through the gas discharge (which is the material 612) is monitored by the detector 614 as the light beam 103 is tuned through the frequencies of allowed transitions for excited atoms or molecules in the gas discharge. When the light beam 103 resonantly excites an atom or molecule from a low-lying state to a state of higher excitation, for example, the atom or molecule is excited to a less bound state, thereby increasing the probability that the atom or molecule will be ionized by discharge collisions and contribute to an increase in the discharge current. The small change in discharge current can be detected with great sensitivity by the detector 614. In contrast to other spectroscopic methods, that can be used to detect the characteristic associated with the interaction between the light beam 103 and the material 612, opto-galvanic spectroscopy does not require an optical detector (such as a photomultiplier tube or photodiode detector) to obtain atomic transition spectra because the gas discharge acts as a resonant photodetector.

Referring again to FIG. 5, the calibration apparatus 510 calibrates the optical device 510 using the calibration material 512. Specifically, to calibrate the optical device 105, the light source 102 scans the wavelength of the light beam 101 (and therefore the diagnostic light beam 103, which is formed from the light beam 101) across the energy transition of the calibration material 512 and the detector 514 detects the transition profile 515. As the wavelength of the light beam 101 is scanned, the optical device 105 (which can be the spectral analysis module 305 of FIG. 3) measures the wavelength of the diagnostic light beam 103. As an example, the spectral analysis module 305 measures the center wavelength 309 of the spectral profile 308 of the light beam 103, as shown in FIG. 3. In addition, as the wavelength of the light beam 101 is scanned by the light source 102, the spectral analysis module 305 outputs the estimated wavelength $\lambda 305$ of the diagnostic light beam 103 (based on the center wavelength 309) to the calibration control module 516. As discussed above, the spectral analysis module 305 estimates the wavelength $\lambda 305$ of the light beam 101 based on the measurement relating to the spatial components 306 that are sensed by the sensor 344 as well as the calibrated model of the optical path length of the optical separation apparatus 342. Moreover, as the wavelength of the light beam 101 is scanned by the light source 102, the detector 514 outputs the measured characteristic of the diagnostic light beam 103 to the calibration control module 516. Specifically, the detector 514 outputs the transition profile 515 to the calibration control module 516.

The calibration control module 516 determines the moment when the transition profile 515 is at the peak value (or at the known energy transition) $\lambda ref$. The calibration control module 516 compares a wavelength $\lambda 305p$ of the light beam 103 output from the spectral analysis module 305 at the time that it determines the transition profile 515 is at the peak value $\lambda ref$. In other words, the wavelength $\lambda 305p$ is the wavelength that is calculated by and output from the control module 350 (FIG. 3) within the spectral analysis module 305 at the time that the calibration control module 516 determines the transition profile 515 is at the peak value $\lambda ref$. The calibration control module 516 adjusts one or more operating parameters of the spectral analysis module 305 until it determines that the wavelength $\lambda 305p$ is equal to the peak value $\lambda ref$. Once these two values ($\lambda 305p$ and $\lambda ref$) are equal, then the spectral analysis module 305 is calibrated.

In general, the spectral analysis module 305 is outputting an accurate measurement of the wavelength $\lambda 305$ of the diagnostic light beam 103 if these two values, namely, $\lambda ref$ and $\lambda 305p$, are equal to or within an acceptable range of each other. If, however, these two values, $\lambda ref$ and $\lambda 305p$, are not equal and are not within an acceptable range of each other, then this means that the accuracy of the spectral analysis module 305 is not acceptable. A calibration should be performed before the spectral analysis module 305 enters a state in which the two values ($\lambda ref$ and $\lambda 305p$) are not within an acceptable range of each other. On the other hand, a calibration would not be needed if the two values $\lambda ref$ and $\lambda 305p$ are equal or significantly close in value.

The acceptable range quantifies an absolute wavelength error and can be defined by an absolute difference $\Delta \lambda$ between $\lambda ref$ and $\lambda 305p$. Specifically, the acceptable range can be an upper or maximum value of the absolute wavelength error $\Delta \lambda$ that would be tolerated during operation. In other words, if the absolute difference $\Delta \lambda$ between the two values, $\lambda ref$ and $\lambda 305p$, for example, is less than 0.2 pm, less than 0.3 pm, or less than 0.4 pm, then the two values, $\lambda ref$ and $\lambda 305p$, are within an acceptable range of each other. Thus, in the past, the calibration apparatus 510 might perform calibrations even if the absolute wavelength difference $\Delta \lambda$ were substantially less than 0.2 pm. For example, in the past, the calibration apparatus 510 might perform an unnecessary calibration even in situations in which the absolute wavelength difference $\Delta \lambda$ were less than 0.007 pm. But, the calibration apparatus 510 would not need to perform a calibration in such a situation. So in the existing situation we have many unnecessary calibrations which increases the down time of the system and reduces the system availability. On the other hand, the calibration apparatus 510 should be performing a calibration on the spectral analysis module 305 if the absolute difference $\Delta \lambda$ between these two values, $\lambda ref$ and $\lambda 305p$, is close to but not more than the limits (0.2 pm, 0.3 pm, or 0.4 pm).

Figure 7:
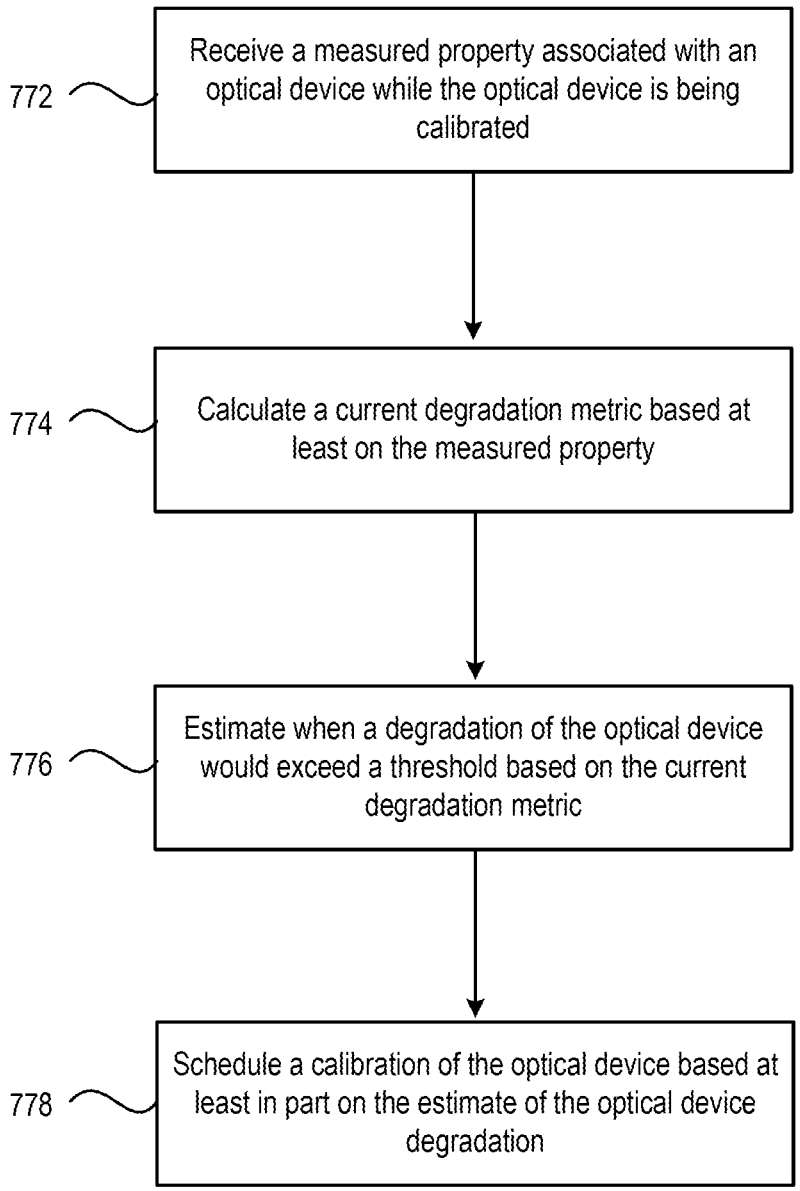
FIG. 7 is a flow chart of a procedure for scheduling a calibration relating to the optical device of FIG. 1 that is performed by the calibration system of FIG. 1 or the implementation of the calibration system of FIG. 5.

The calibration of the spectral analysis module 305 performed by the calibration apparatus 510 can take several minutes to perform and complete. For example, a calibration can take one (1) to five (5) minutes to perform and complete. During calibration of the spectral analysis module 305, the output device 104 is not receiving the light beam 101 within a required specification, and therefore the output device 104 is not operating. This down time in operation of the output device 104 due to calibration reduces the output and production of the output device 104. For this reason, as discussed next, the calibration system 100 and the prediction controller 130 perform a procedure to schedule calibrations of the optical device 105 and the spectral analysis module 305 when calibrations are needed and not when calibrations are not needed. The prediction controller 130 looks at data from the last several (for example, three, four, five, or more) calibrations, and predicts when the two values ($\lambda ref$ and $\lambda 305p$) would be out of an acceptable range of each other in the future, and therefore predicts when the next calibration should take place to ensure that the spectral analysis module 305 operates with an acceptable accuracy and avoids a situation in which the absolute difference $\Delta \lambda$ exceeds the acceptable range. Referring to FIG. 7, a procedure 770 is performed for scheduling a calibration relating to the optical device 104. The procedure 770 is performed by the calibration system 100 (FIGS. 1 and 2) or the calibration system 500 (FIG. 5).

The procedure 770 includes receiving a measured property associated with the optical device 105 while the optical device 105 is being calibrated (772). The measured property associated with the optical device 105 can be received by the input module 232 of the prediction controller 130 (FIG. 2). In some implementations, the calibration control module 516 provides the measured property to the input module 232 of the prediction controller 130. In one example, the calibration control module 516 provides the error measurement or wavelength error, that is, the absolute difference $\Delta\lambda$, which is the difference between the measured wavelength $\lambda 305p$ of the diagnostic light beam 103 and the reference center wavelength $\lambda\text{ref}$ that is associated with the known energy transition of the material 512 in the calibration apparatus 510. The error measurement is given by Equation 1:

$$\Delta\lambda = \lambda 2305p - \lambda\text{ref} \qquad \text{Equation (1)}$$

where $\lambda\text{ref}$ is the reference wavelength of the known energy transition of the calibration material 512, and $\lambda 305p$ is the estimate of the wavelength of the diagnostic light beam 103 output from the spectral analysis module 305 when the light source 102 outputs the light beam 101 having the reference wavelength $\lambda\text{ref}$. The wavelength error $\Delta\lambda$ quantifies how much the accuracy of the spectral analysis module 305 has drifted when one or more parameters change within the spectral analysis module 305 due to use. The calibration control module 516 can calculate the wavelength error $\Delta\lambda$ while the spectral analysis module 305 is being calibrated and the input module 232 of the prediction controller 130 receives the wavelength error $\Delta\lambda$ from the control module 516.

Next, and referring back to FIG. 7, a current degradation metric $\alpha$ is calculated based at least on the measured property (774). For example, the adaptive module 234 of the prediction controller 130 receives the measured property from the input module 232, and the adaptive module 234 calculates the current degradation metric a based at least on the measured property (which, in this example, is the wavelength error $\Delta\lambda$). The degradation metric $\alpha$ models the behavior of the optical device 105. Specifically, the adaptive module 234 can estimate how much the measured property changes relative to a change in usage of the optical device 105. In other words, as the optical device 105 is used over time during operation of the light source 102, the measured property can change in value. In one example, and with reference to FIGS. 3 and 4, the optical path length of the light beam 103 within the spectral analysis module 305 can change due to changes in any one or more of the refractive index and the geometric path length that occur during operation of the calibration system 500, thereby causing errors in the measurement of the wavelength $\lambda 305$ by the spectral analysis module 305. This measurement error, which shows up in the wavelength error $\Delta\lambda$, causes a change in value of the measured property that can be modeled as the degradation metric by the adaptive module 234.

The degradation metric a can be based on a cumulative sum $\Sigma$ of the current wavelength error $\Delta\lambda$plus one or more wavelength errors $\Delta\lambda p$ that are output from the control module 516. The current degradation metric $\alpha$ can correspond to a local linear approximation of the slope of a trend of the measured property. For example, the trend can be a linear trend or a non-linear trend, and the local linear approximation of the slope can be positive or negative when the slope is positive or negative, respectively. In this way, the measured property is assumed to change in a linear manner relative to a change in usage of the optical device 105. In particular, the cumulative sum $\Sigma$ of the current wavelength error $\Delta\lambda$ and one or more wavelength errors $\Delta\lambda p$ that are output from the control module 516 provides information about the trend of the wavelength error $\Delta\lambda$.

Next, the prediction controller 130 estimates when the degradation of the optical device 105 would exceed a predetermined threshold MaxErr based on the current degradation metric $\alpha(i)$ (776), where i corresponds to the most recent (and current) calibration event performed on the spectral analysis module 305. Therefore, i−1 is the calibration event performed on the spectral analysis module 305 that came immediately prior to the calibration event i and i+1 is the next calibration event that will be scheduled by the prediction controller 130. The adaptive module 234 of the prediction controller 130 performs an analysis based on the calculated current degradation metric $\alpha$ (from 774) and estimates when the accuracy of the optical device 105 would become unacceptable. The prediction controller 130 schedules a calibration of the optical device 105 based at least in part on the estimate of the degradation of the optical device 105 (778). For example, the adaptive module 234 can schedule the calibration based on the degradation estimate (from 776) and provide this scheduled event to the output module 236. The adaptive module 234 estimates how many pulses of the light beam 101 can be produced UsePredict (i+1) before the degradation of the optical device 105 exceeds the threshold MaxErr. This estimate can be written as equation:

$$UsePredict(i+1) = \frac{\text{MaxErr}}{\alpha(i)} \qquad \text{Equation (2)}$$

As mentioned, at step 774, the adaptive module calculates the degradation metric a, which models the behavior of the optical device 105. This estimate relies on an assumption that the current degradation metric $\alpha$ corresponds to a local linear approximation of the slope of a trend of the measured property. If the local behavior of the trend of the measured property is not linear, then the calculated degradation metric a may not adequately capture the local behavior of the trend of the measured property. In this case, the adaptive module 234 can adjust how it schedules the calibration of the optical device 105 so that it takes into account the reliability of the model of the behavior of the optical device 105. Details regarding the steps of the procedure 770 are discussed next with reference to examples.

Figure 8B:
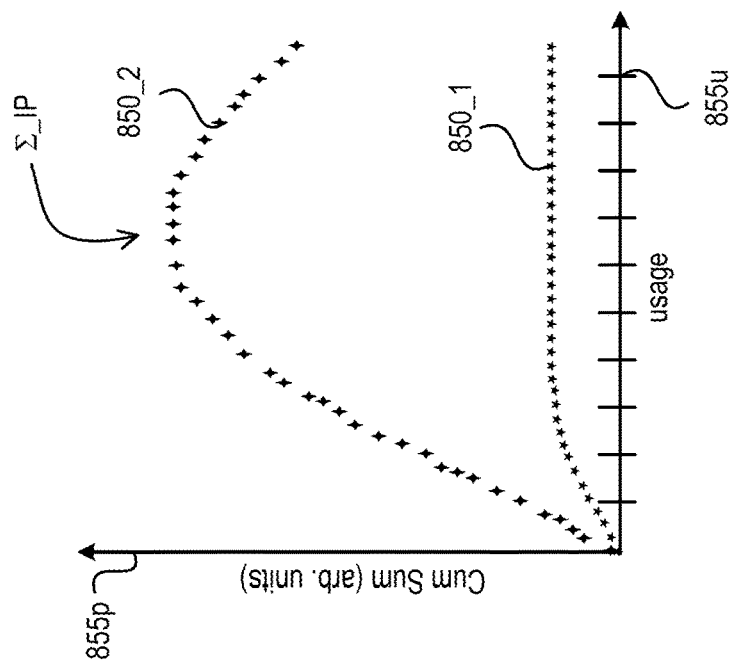
FIG. 8B is a first graph showing the behavior of a cumulative sum of a measured property for the first spectral analysis module of FIG. 8A relative to the same usage of the first spectral analysis module of FIG. 8A and a second graph showing the behavior of a cumulative sum of a measured property for the second spectral analysis module of FIG. 8A relative to the same usage of the second spectral analysis module of FIG. 8A.
Figure 8A:
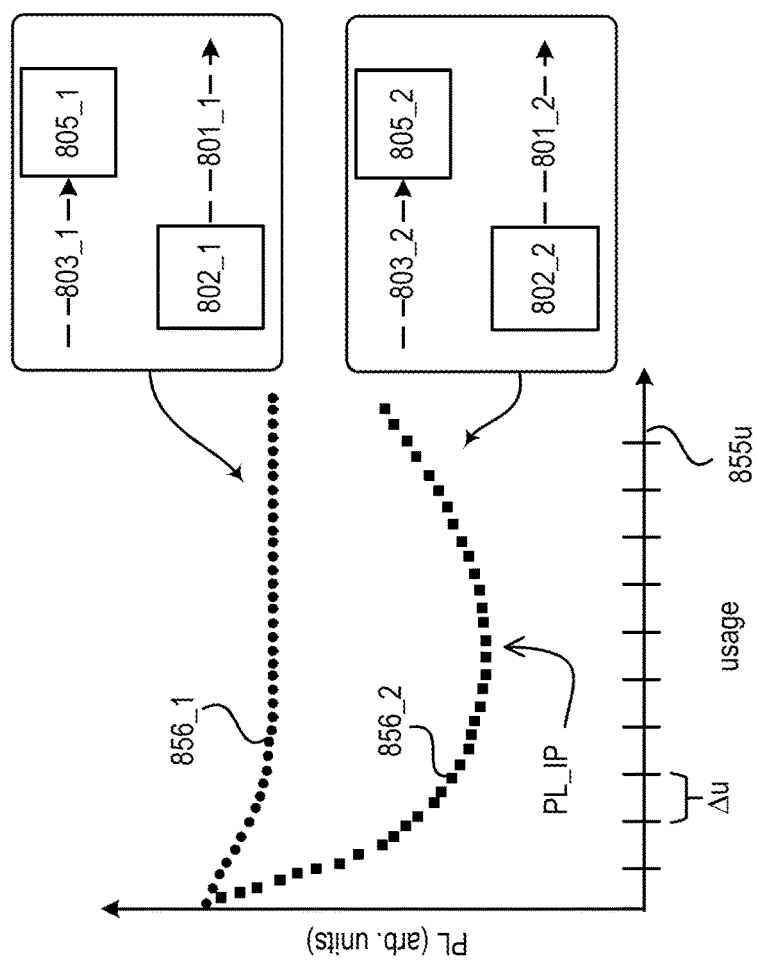
FIG. 8A is a first graph showing the behavior of an optical path length of a first spectral analysis module associated with a first light source relative to a usage of the first spectral analysis module and a second graph showing the behavior of an optical path length of a second spectral analysis module separate and distinct from the first spectral analysis module and associated with a second light source separate and distinct from the first light source relative to a usage of the second spectral analysis module.

Referring to FIG. 8A, graphs 856_1, 856_2 show the behavior of the optical path length PL of respective and distinct spectral analysis modules 805_1, 805_2 associated with respective light sources 802_1, 802_2 relative to the usage 855u of that spectral analysis module 805_1, 805_2. Each data point in the graph 856_1, 856_2 corresponds to a calibration event during which the spectral analysis module 805_1 or 805_2 is calibrated by the calibration apparatus 110. The most recent and current calibration event is labeled as i, the last most recent calibration event is i−1, and a future or planned next calibration event is i+1. The usage 855u of the spectral analysis module 805_1, 805_2 can correspond to a number of pulses of the light beam 801_1, 801_2 produced by the light source 802_1, 802_2 and also to the number of pulses of the diagnostic light beam 803_1, 803_2 that are analyzed by the respective spectral analysis module

805_1, 805_2. As is evident from these graphs 856_1, 856_2, the optical path length PL of the spectral analysis module 805_1, 805_2 drifts with usage. Moreover, the optical path length PL tends to drift in a continuous and smooth manner. In these examples, this drift occurs slowly and over a large number of pulses of the light beam 801_1, 801_2. In particular, the scale Δu of the usage shown in the graphs 856_1, 856_2 is on the order of millions or billions of pulses of the light beam 801_1, 801_2.

The behavior of the optical path length PL of the spectral analysis module 805_1 tends to drop and level off with usage 855u, and it lacks an inflection point for the period of usage shown in the graph 856_1. This means that the optical path length PL of the spectral analysis module 805_1 tends to change in one direction. On the other hand, the behavior of the optical path length PL of the spectral analysis module 805_2 drops initially, then goes through an inflection point PL_IP, after which it rises during the period of usage shown in graph 856_2. This means that the optical path length PL of the spectral analysis module 805_2 changes in two directions at different moments of usage 855u.

The non-linearity in the shape of the graph 856_1 and 856_2 can occur due to changes in properties of the respective spectral analysis module 805_1, 805_2. For example, the spectral analysis module 405 can experience oxidization of organic materials, and this can change indices of refraction within the module 405, which can impact the optical path length within the etalon. For the spectral analysis module 805_2, in which the graph 856_2 has an inflection PL_IP, a downward PL trajectory may reflect a "getter phase" during which oxygen is oxidizing organic material in the module 805_2, and a gas index is decreasing. And, once the oxygen is consumed by continued methanol outgassing, organics begin to deposit on the cavity of the etalon, which reverses the PL trajectory and it begins to rise.

Referring to FIG. 8B, graphs 850_1, 850_2 show the behavior of the respective cumulative sum Σ 855p of the measured property for respective spectral analysis modules 805_1, 805_2 relative to usage 855u and over the same usage 855u during which the graphs 856_1, 856_2 are produced. As above, each data point in the graph 850_1, 850_2 corresponds to a calibration event during which the spectral analysis module 805_1 or 805_2 is calibrated by the calibration apparatus 110. The most recent and current calibration event is labeled as i, the last most recent calibration event is i−1, and a future or planned next calibration event is i+1. Like the graphs 856_1, 856_2, the graphs 850_1, 850_2 drift in a continuous and smooth manner. Moreover, the drift occurs slowly and over a large number of pulses of the light beam 801_1, 801_2. The trend of the graph 850_1 is similar in shape to but inverted relative to the trend of the graph 856_1; and the trend of the graph 850_2 is similar in shape to but inverted relative to the trend of the graph 856_2.

Since the behavior shown in the graph 850_1/850_2 is related to the behavior shown in respective graph 856_1/856_2, the shape and trend of the cumulative sum Σ 855p of the measured property can be used to understand the drift in the optical path length PL. And, because the drift in the optical path length PL is directly related to the degradation of the spectral analysis module 805_1, 805_2, it is possible to predict degradation of the spectral analysis module 805_1, 805_2 based on the cumulative sum Σ 855p of the measured property. This is useful because in order to develop a model of the degradation of the spectral analysis module 305 (such as at step 774 of the procedure 770), the cumulative sum Σ 855p of the measured property does not require unit conversion, and it also provides a more intuitive understanding of the performance of the spectral analysis module 305. In particular, the difference between each two data points in the cumulative sum Σ 855p of the measured property indicates how much wavelength error may be experienced if a calibration is not performed between those two points.

Similar to the behavior of the optical path length PL of the spectral analysis module 805_1, the cumulative sum Σ 855p of the measured property of the spectral analysis module 805_1 tends to rise and then level off with usage 855u, and it lacks an inflection point for the period of usage shown in the graph 850_1. This means that the cumulative sum Σ 855p of the measured property of the spectral analysis module 805_1 tends to change in one direction during the usage. The behavior of the cumulative sum Σ 855p of the measured property of the spectral analysis module 805_1 can be linearly approximated at all times during the usage when observed in small usage windows, such as from one calibration event to an adjacent calibration event.

On the other hand, the cumulative sum Σ 855p of the measured property of the spectral analysis module 805_2 rises initially, then goes through an inflection point Σ_IP, after which it drops. This means that the cumulative sum Σ 855p of the measured property of the spectral analysis module 805_2 changes in two directions at different moments of usage 855u. The behavior of the cumulative sum Σ 855p of the measured property of the spectral analysis module 805_2 can be linearly approximated when observed in certain small usage windows that are not close to the inflection point Σ_IP, a small usage window including one calibration event to an adjacent calibration event. The cumulative sum Σ 855p of the measured property of the spectral analysis module 805_2 may need to be non-linearly approximated when observed in certain small usage windows that are close to or overlapping with the inflection point Σ_IP, a small usage window including one calibration event to an adjacent calibration event.

Figure 9:
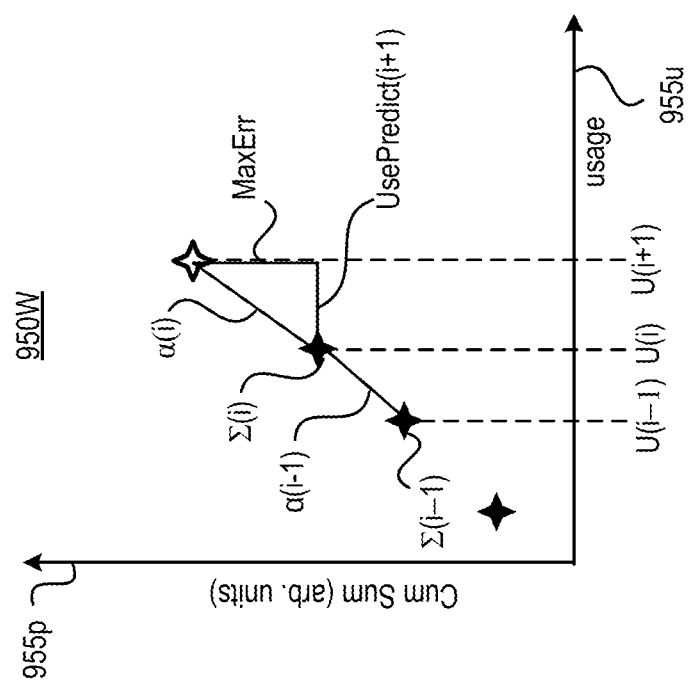
FIG. 9 is a graph that shows the operation of the procedure of FIG. 7 as values of a cumulative sum of the spectral analysis module of FIG. 3 relative to usage of the spectral analysis module for a local window of the usage.

Referring to FIG. 9, in order to show operation of the procedure 770, values of a cumulative sum Σ of a spectral analysis module 305 are shown relative to usage 955u for a local window 950W of usage. In this depiction, the current and most recent calibration event is i and occurs at usage Ui. Moreover, i−1 is the calibration event performed on the spectral analysis module 305 that came immediately prior to the calibration event i, and i+1 is the next calibration event that will be scheduled by the prediction controller 130. The current degradation metric α(i) provides an estimate of the slope of the cumulative sum Σ in a small usage window that is bounded by the current and most recent calibration event that occurs at usage Ui. The current degradation metric α(i) forms the hypotenuse of a right-angled triangle that assumes the cumulative sum Σ changes in a linear fashion in this small usage window from the value Σ(i). Depicted in graph form, the usage UsePredict(i+1) is estimated by extending the hypotenuse from the value of the cumulative sum Σ 955p at the last calibration event i along the calculated slope α(i) by a usage that corresponds to the predetermined threshold MaxErr to form a right-angled triangle.

Next, the adaptive scheme for calculating the current degradation metric α(i) based on the measured property (step 774) is described. In the following discussion, the measured property is a prior wavelength error Δλ(i−1), which corresponds to the difference between the measured wavelength λ305p(i−1) of the diagnostic light beam 103 (output from the spectral analysis module 305 at the prior calibration event i−1) and the reference center wavelength λref that is associated with the known energy transition of the material 512 in the calibration apparatus 510. The last value of the cumulative sum Σ is given by Σ(i−1), which corresponds to the sum of the prior wavelength errors up to and including the wavelength error Δλ(i−1).

At initialization of the adaptive scheme, such as when the spectral analysis module 305 is first initiated, and the first calibration corresponds to i=1, the following values are set: α(1)=0; EstErr(1)=0; Σ(1)=Δλ(1); EstΣ(1)=Σ(1); and Max-Err=0.1 pm. The MaxErr can be set to be one half the value of a desired requirement, such as from a customer, thus allowing for a safety margin of one half of the value of the desired requirement. EstErr is an indication of the reliability of the adaptive scheme being performed for the current calibration event i. EstΣ is an estimate of the cumulative wavelength error for the current calibration event i. At each iteration, and for a current and most recent calibration event i, the estimated cumulative wavelength error EstΣ(i) is given by Equation 3:

$$\text{Est}\Sigma(i)=E(i-1)+\alpha(i-1)*U(i) \quad \text{Equation (3)}$$

Next, the value for the reliability estimate EstErr(i) for the current and most recent calibration event i is given by Equation 4:

$$\text{EstErr}(i)=\Sigma(i)-\text{Est}\Sigma(i) \quad \text{Equation (4)}$$

where Σ(i) corresponds to the sum of the prior wavelength errors up to and including the current wavelength error Δλ(i). The reliability estimate EstErr(i) provides an indication regarding how reliable the local linear approximation is and therefore this reliability estimate EstErr(i) can provide an indication regarding whether the local trend of the cumulative sum Σ can be linearly approximated or whether a linear approximation of the cumulative sum Σ is inadequate (such as near the inflection point Σ_IP (FIG. 8B). The current degradation metric α(i) is calculated (774) based on this reliability estimate as:

$$\alpha(i)=\alpha(i-1)+\eta \text{EstErr}(i), \quad \text{Equation (5)}$$

where η is a constant that acts as a gain of a low pass filter. The constant η can be selected such that 0<η<1 and can be a configurable parameter.

As discussed above, the adaptive module 234 schedules the calibration based on this degradation metric α(i) (778) by, for example, first estimating how many pulses of the light beam 101 can be produced. UsePredict1(i+1) (776) according to the equation noted above, and reproduced next as Equation 6:

$$\text{UsePredict1}(i+1) = \frac{\text{MaxErr}}{\alpha(i)} \quad \text{Equation (6)}$$

Once the value for UsePredict1(i+1) is estimated (776), then it can be used to schedule the next calibration (778), as discussed next.

In some implementations, the next calibration is scheduled (778) based on the actual value of UsePredict1(i+1); that is, the next calibration is scheduled to occur at the number of pulses determined in UsePredict1(i+1).

In other implementations, the scheduling of the next calibration (778) takes into account not only the value of UsePredict1 (i+1) but also the reliability estimate EstErr(i). For example, a second value of UsePredict2(i+1) can be determined by comparing the reliability estimate EstErr(i) to one or more thresholds Thr (such as Thr1, Thr2, Thr3, Thr4) that are given in units of distance (wavelength). The values for the thresholds Thr are configurable, and can be modified. In one example, Thr1=0.4 pm, Thr2=0.2 pm, Thr3=0.01, and Thr4=0.005. If the absolute value of EstErr(i)>Thr1, then UsePredict2(i+1)=UseValue1, which can be 300 million pulses of the light beam 101. If Thr2<absolute value of EstErr(i)<Thr1, then UsePredict2(i+1)=UseValue2, which can be 600 million pulses of the light beam 101. If Thr3<absolute value of EstErr(i)<Thr2, then UsePredict2(i+1)=UseValue3, which can be 1200 million pulses of the light beam 101. Generally, if Thr(n−1)<the absolute value of EstErr(i)<Thr(n), where n can be 1, 2, 3, 4 or more, then UsePredict2(i+1)=UseValue(n), which can be $300 \times 2^n$. The next calibration is scheduled by determining the minimum value between UsePredict1(i+1) and UsePredict2(i+1).

In this way, the output module 236 determines when to perform the next or subsequent calibration of the spectral analysis module 305. The output module 236 can instruct the calibration apparatus 510 to calibrate the spectral analysis module 305 based on this schedule. As such, the prediction controller 130 determines when the subsequent calibration of the spectral analysis module 305 should advantageously be scheduled, and communicates with the calibration apparatus 510 to calibrate the spectral analysis module 305 when the calibration is needed. Moreover, the spectral analysis module 305 is not calibrated when the spectral analysis module 305 does not need to be calibrated, thereby decreasing the amount of time in which the spectral analysis module 305 is inoperable (during calibration).

Figure 10:
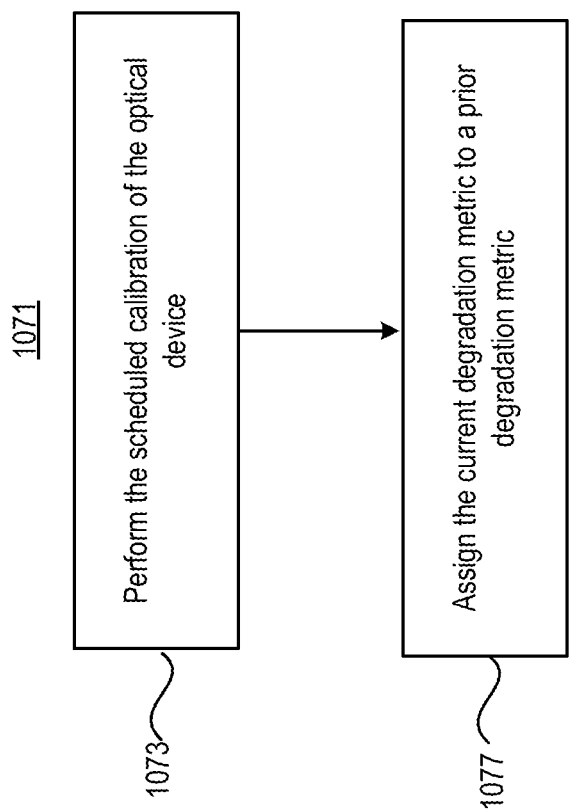
FIG. 10 is a flow chart of a procedure that is performed after scheduling the calibration relating to the optical device using the procedure of FIG. 7.

Referring also to FIG. 10, a procedure 1071 is performed after scheduling the calibration of the optical device 105 (which can be the spectral analysis module 305) at step 778 of the procedure 770. After the next calibration of the spectral analysis module 305 is scheduled (778), the output module 236 of the prediction controller 130 sends an instruction to the calibration apparatus 510 regarding when to perform the next calibration (1073). Moreover, the current degradation metric α(i) is assigned to the prior degradation metric α(i−1) and other variables in the adaptive scheme discussed above can be updated as well (1077). The current degradation metric α(i) that is associated with this next calibration can then be calculated as an updated metric, for example, using the procedure 770.

Figure 11:
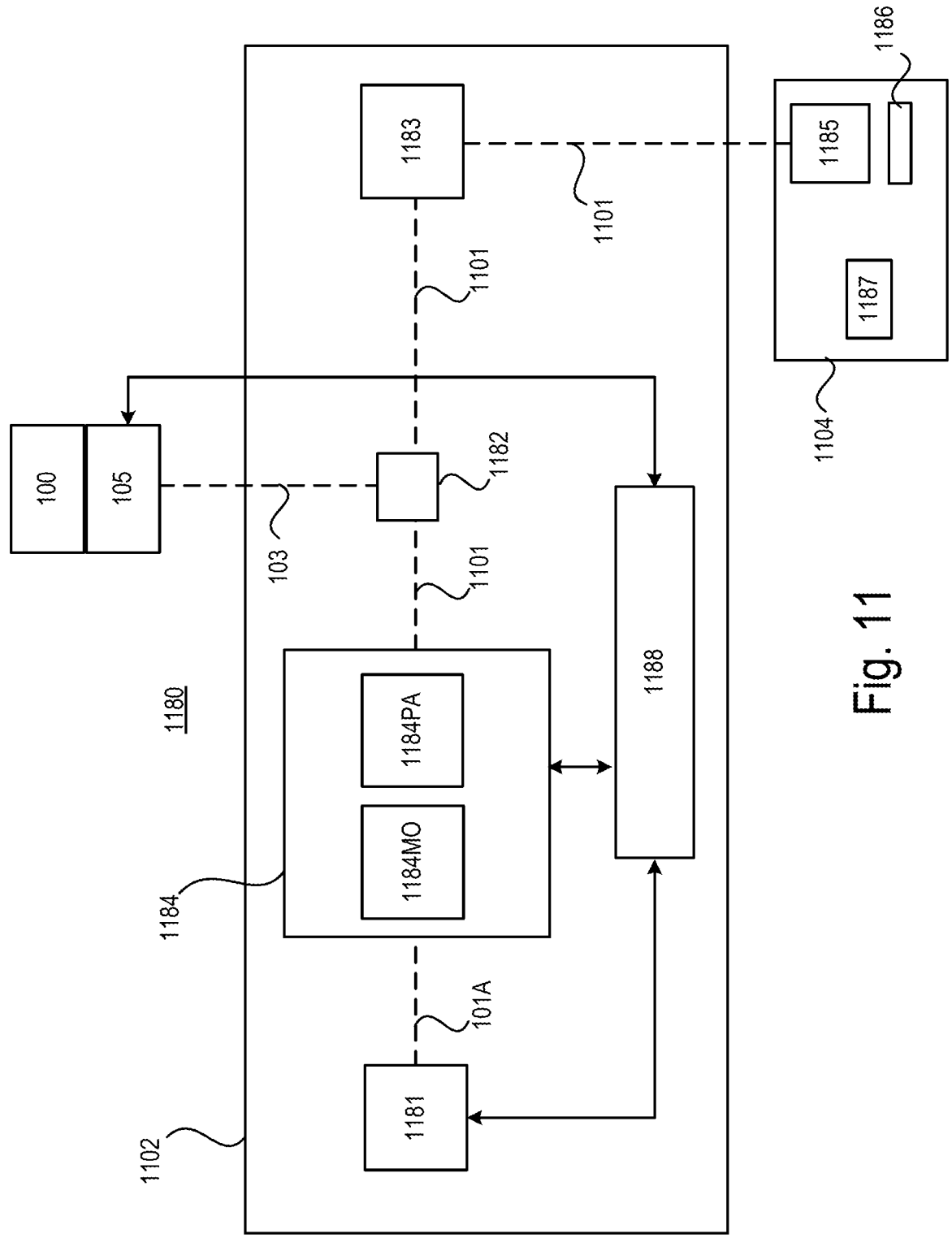
FIG. 11 is a photolithography system that includes an illumination system that produces a light beam directed to a photolithography exposure apparatus, the optical device of FIG. 1, and the calibration system of FIG. 1.

Referring to FIG. 11, a photolithography system 1180 includes an illumination system 1102 that produces the light beam 1101 having a wavelength that is nominally at a center wavelength and is directed to a photolithography exposure apparatus or scanner 1104 by way of a beam preparation system 1183 that can include beam directing and beam modification optics. The illumination system 1102 is an implementation of the light source 102 and the exposure apparatus 1104 is an implementation of the optical device 104 (FIG. 1). The photolithography system 1180 also includes the optical device 105 and the calibration system 100 arranged relative to the optical device 105. The optical device 105 receives the diagnostic light beam 103, which is the portion of the light beam 101 that has been split off from the light beam 101 by a beam splitter 1182.

The light beam 1101 is produced by an optical source 1184 and is directed to a wafer 1186 in the exposure apparatus 1104 to thereby pattern microelectronic features on the wafer 1186. The light beam 1101 has a wavelength in the deep ultraviolet (DUV) range, for example, about 248 nanometers (nm) or about 193 nm. The size of the microelectronic features patterned on the wafer 1186 depends on the wavelength of the light beam 1101, with a lower wavelength resulting in a smaller minimum size. When the wavelength of the light beam 1101 is 248 nm or 193 nm, the minimum size of the microelectronic features can be, for example, 50 nm or less.

Various disturbances (such as, for example, temperature gradients, pressure gradients, optical distortions) act on the optical source 1184 and the light beam 1101 to modify the spectral properties or features (such as the wavelength) of the light beam 1101. Thus, the lithography system 1180 includes other components, such as, for example, a spectral feature selection system 1181, the optical device 105 that is configured to measure aspects (such as the wavelength) relating to the light beam 1101, and a control system 1188, that are used in combination to determine the impact of the disturbances on the light beam 1101 and to correct for the effect of such disturbances on the light beam 1101.

In some implementations, the optical source 1184 is an excimer optical source that outputs the pulsed light beam 1101 (which can be a laser beam). As the pulsed light beam 1101 enters the photolithography exposure apparatus 1104, it is directed through a projection optical system 1185 and projected onto the wafer 1186 to form one or more microelectronic features on a photoresist on the wafer 1186. The photolithography exposure apparatus 1104 can also include a controller 1187 that can communicate with the control system 1188 of the illumination system 1102.

In the implementation shown, the optical source 1184 is a two-stage system that includes a master oscillator (MO) 1184MO that provides a seed light beam to a power amplifier (PA) 1184PA. The MO 1184MO and the PA 1184PA can be considered to be subsystems of the optical source 1184 or systems that are part of the optical source 1184. The power amplifier 1184PA receives the seed light beam from the master oscillator 1184MO and amplifies the seed light beam to generate the light beam 1101 for use in the photolithography exposure apparatus 1104. For example, the master oscillator 1184MO can emit a pulsed seed light beam with seed pulse energies of approximately 1 milliJoule (mJ) per pulse, and these seed pulses can be amplified by the power amplifier 1184PA to about 10 to 15 mJ.

The master oscillator 1184MO includes a MO discharge chamber having two elongated electrodes (which constitute an excitation mechanism), a gain medium that is a gas mixture, and a fan for circulating gas between the electrodes. A resonator is formed between the spectral feature selection system 1181 on one side of the discharge chamber of the master oscillator 1184MO and an output coupler on a second side of the discharge chamber master oscillator 1184MO. The power amplifier 1184PA includes a beam coupling optical system that receives the seed light beam from the master oscillator 1184MO and directs the seed light beam through a PA discharge chamber, and to a beam turning optical element, which modifies or changes the direction of the seed light beam so that it is sent back into the PA discharge chamber. The PA discharge chamber includes a pair of elongated electrodes, a gain medium that is a gas mixture, and a fan for circulating the gas mixture between the electrodes.

The gas mixture of the gain media used in respective discharge chambers can be any gas suitable for producing a light beam at the wavelength and bandwidth required for the application at the output device (the photolithography exposure apparatus 1104). For an excimer source, the gas mixture can contain a noble gas (rare gas) such as, for example, argon or krypton, a halogen, such as, for example, fluorine or chlorine and traces of xenon apart from helium and/or neon as buffer gas. Specific examples of the gas mixture include argon fluoride (ArF), which emits light at a wavelength of about 193 nm, krypton fluoride (KrF), which emits light at a wavelength of about 248 nm, or xenon chloride (XeCl), which emits light at a wavelength of about 351 nm. The excimer gain medium (the gas mixture) is pumped with short (for example, nanosecond) current pulses in a high-voltage electric discharge by application of a voltage (the excitation signal) to the respective elongated electrodes.

The light beam 1101 is a pulsed light beam and can include one or more bursts of pulses that are separated from each other in time. Each burst can include one or more pulses of light. In some implementations, a burst includes hundreds of pulses, for example, 100-400 pulses.

As discussed above, when the gain medium within the MO and the PA is pumped by applying voltage to the electrodes, the gain medium in the MO or PA emits light. When the voltage is applied to the electrodes in pulses, the light emitted from the gain medium is also pulsed. Thus, the repetition rate of the pulsed light beam 1101 is determined by the rate at which voltage is applied to the electrodes, with each application of voltage producing a pulse of light. The pulse of light propagates through the gain medium and exits the chamber through the output coupler. Thus, a train of pulses is created by periodic, repeated application of voltage to the electrodes. The repetition rate of the pulses can range between about 500 Hz and 6,000 Hz. In some implementations, the repetition rate is be greater than 6,000 Hz, and can be, for example, 12,000 Hz or greater. The pulsed light beam 1101 can have an average output power in the range of tens of watts, for example, from about 50 W to about 130 W. The irradiance (that is, the average power per unit area) of the light beam 1101 at the output may range from 60 W/cm$^2$ to 80 W/cm$^2$.

Figure 12:
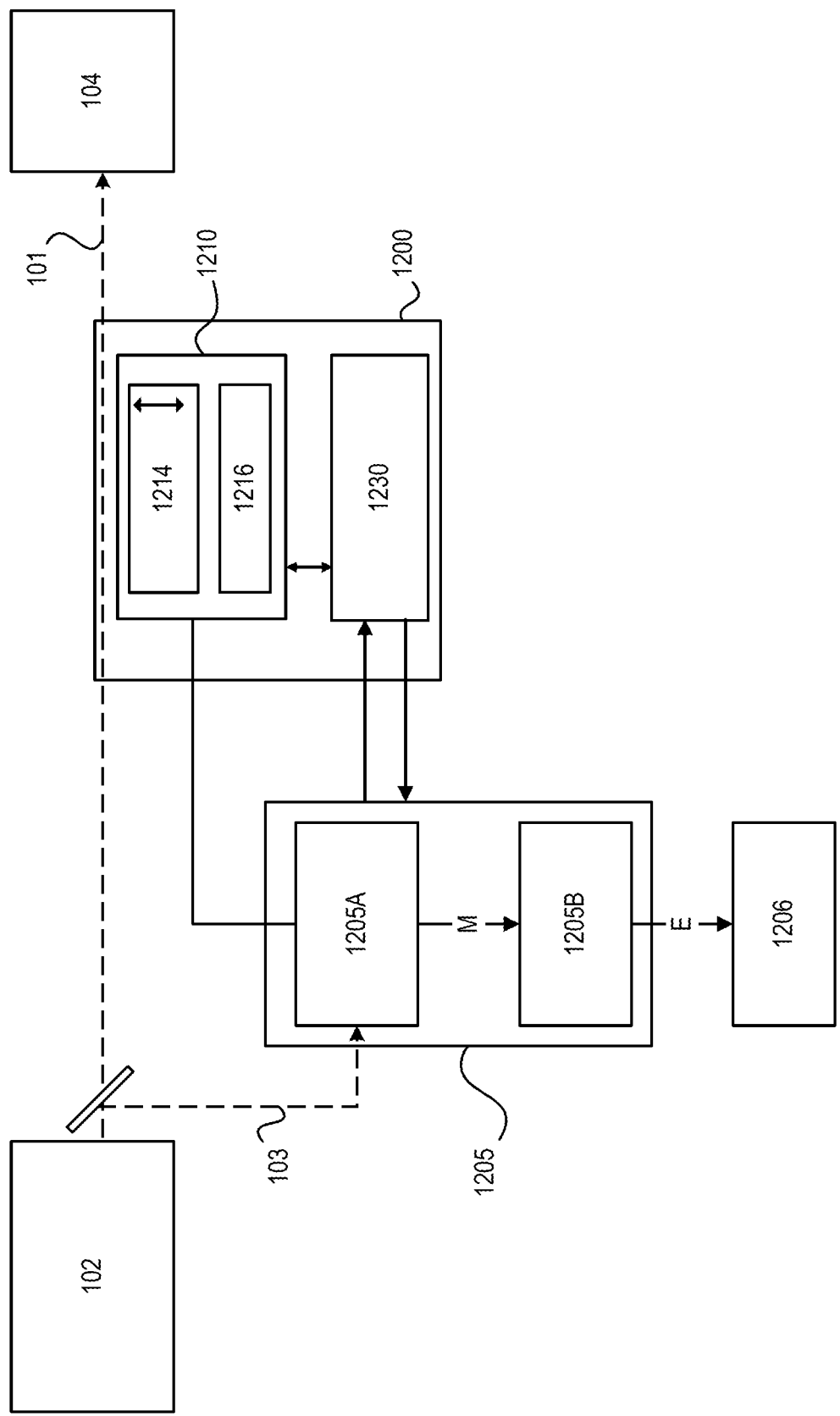
FIG. 12 is a block diagram of an implementation of the optical device and the calibration system of FIG. 1.

Referring to FIG. 12, in some implementations, the optical device 105 is an energy analysis module 1205 and the calibration system 100 is configured as a calibration system 1200 for interfacing with the energy analysis module 1205. The energy analysis module 1205 is configured to receive the diagnostic light beam 103 from the light source 102, where the diagnostic light beam 103 is split off the main light beam 101. The energy analysis module 1205 includes a photodetector 1205A and a conversion module 1205B in communication with the photodetector 1205A. The output from the conversion module 1205B is provided to energy control components 1206 associated with or within the light source 102 for controlling the energy of the light beam 101.

The photodetector 1205A can be include a photodiode that outputs a current or a voltage value that is converted to a digital value M. The digital value M is proportional to an energy of the light beam 101 because the diagnostic light beam 103 is a portion that is divided from the light beam 101. The digital value M is output to the conversion module 1205B. The conversion module 1205B converts this digital value M to an energy value E, the energy value E being an estimate of the energy of the main light beam 101, and used by the energy control components 1206 for controlling the energy of the light beam 101.

The calibration system 1200 includes an implementation 1210 of the calibration apparatus 110 and an implementation 1230 of the prediction controller 130. The prediction controller 1230 can be designed like the prediction controller 130 of FIG. 2. The calibration apparatus 1210 includes a measurement device 1214 such as, for example, an optical power meter and a calibration control module 1216 in communication with the optical power meter 1214. The calibration apparatus 1210 is in communication with the prediction controller 1230 and also the optical device 1205. While the calibration control module 1216 is shown as being co-located with the power meter 1214, it is alternatively possible for the calibration control module 1216 to be co-located with or integrated within the optical device 1205.

The power meter 1214 is a device or instrument that is positioned to directly measure a power (the delivered energy per unit time) of the main light beam 101. In some implementations, the power meter 1214 includes a calibrated sensor that measures the average power of a train of pulses of the main light beam 101 (knowing the pulse repetition rate). The power meter 1214 includes a sensor head that contains a power sensor that is movable into and out of the path of the main light beam 101. The power sensor can be a photodiode or other suitable photodetector having a wavelength range that encompasses the wavelength of the main light beam 101. Moreover, the power meter 1214 can also include additional electronics for converting the analog signal into a digital signal that estimates or measures the power Pm of the main light beam 101. The measured power Pm is provided to the calibration control module 1216. The calibration control module 1216 communicates with the power meter 1214 and the optical device 1205 to perform a calibration of the optical device 1205, as discussed in more detail below.

As discussed above, the conversion module 1205B converts the digital value M (which is based on a direct measurement of the diagnostic light beam 103 by the photodetector 1205A) to an energy value E, the energy value E being an indirect estimate of the energy of the main light beam 101. This conversion can be performed according to the following equation:

$$E = MS + O \qquad \text{Equation (7)}$$

where S is a measurement scale and O is an offset. The measurement scale S is a scale that serves multiple purposes. First, the measurement scale S is used to convert the digital value M output from the photodetector 1205A into an energy value. Second, the measurement scale S is used to scale up the energy value from the value associated with diagnostic light beam 103 to an estimate associated with the main light beam 101. This is needed because, as discussed above, the energy of the diagnostic light beam 103 is lower than the energy of the main light beam 101 because the diagnostic light beam 103 is a portion or fraction of the optical energy of the main light beam 101.

The measurement scale S can drift over time. Accordingly, the optical device 1205 needs to be calibrated periodically to account or compensate for this drift in the sensor scale S. During calibration, the power meter 1214 is placed in the path of the main light beam 101 to thereby measure the power Pm of the main light beam 101. This measured power Pm is provided to the calibration control module 1216, which converts this value to an energy value Em by dividing by the repetition rate of the main light beam 101. The calibration control module 1216 compares the measured energy value Em from the power meter 1214 to the estimated energy value E from the optical device 1205 to determine how to adjust or modify the measurement scale S so that the two values are equal. The calibration control module 1216 can further perform a final verification step after the measurement scale S has been adjusted to confirm the adjustment is correct.

The calibration of the optical device 1205 performed by the calibration apparatus 1200 can take several minutes to perform and complete. Moreover, during calibration of the optical device 1205, the output device 104 is not receiving the light beam 101 within a required specification, and therefore the output device 104 is not operating. This down time in operation of the output device 104 due to calibration reduces the output and production of the output device 104. For this reason, as discussed next, the calibration system 1200 and the prediction controller 1230 perform a procedure to schedule calibrations of the optical device 1205 when calibrations are needed and not when calibrations are not needed. The prediction controller 1230 looks at data from the last several calibrations (for example, three, four, five, or more calibrations), and predicts when the measurement scale S would be out of an acceptable drift range in the future, and therefore predicts when the next calibration of the optical device 1205 should take place to ensure that the optical device 1205 operates with an acceptable accuracy and avoids a situation in which the draft of the measurement scale S exceeds the acceptable drift range. The maximum allowed drift in the measurement scale S is given by MaxErr(S). The maximum allowed drift in the measurement scale S MaxErr(S) can be calculated from a maximum allowed error in the energy measurement MaxErr(E) (which is the measurement of the energy of the main light beam 101 as follows:

$$\text{MaxErr}(S) = \text{MaxErr}(E) \frac{E_T \times S}{E_T - O} \qquad \text{Equation (8)}$$

where $E_T$ is an energy target that can be obtained from a nominal energy value and O is the measurement offset for the photodetector 1205A.

Figure 13:
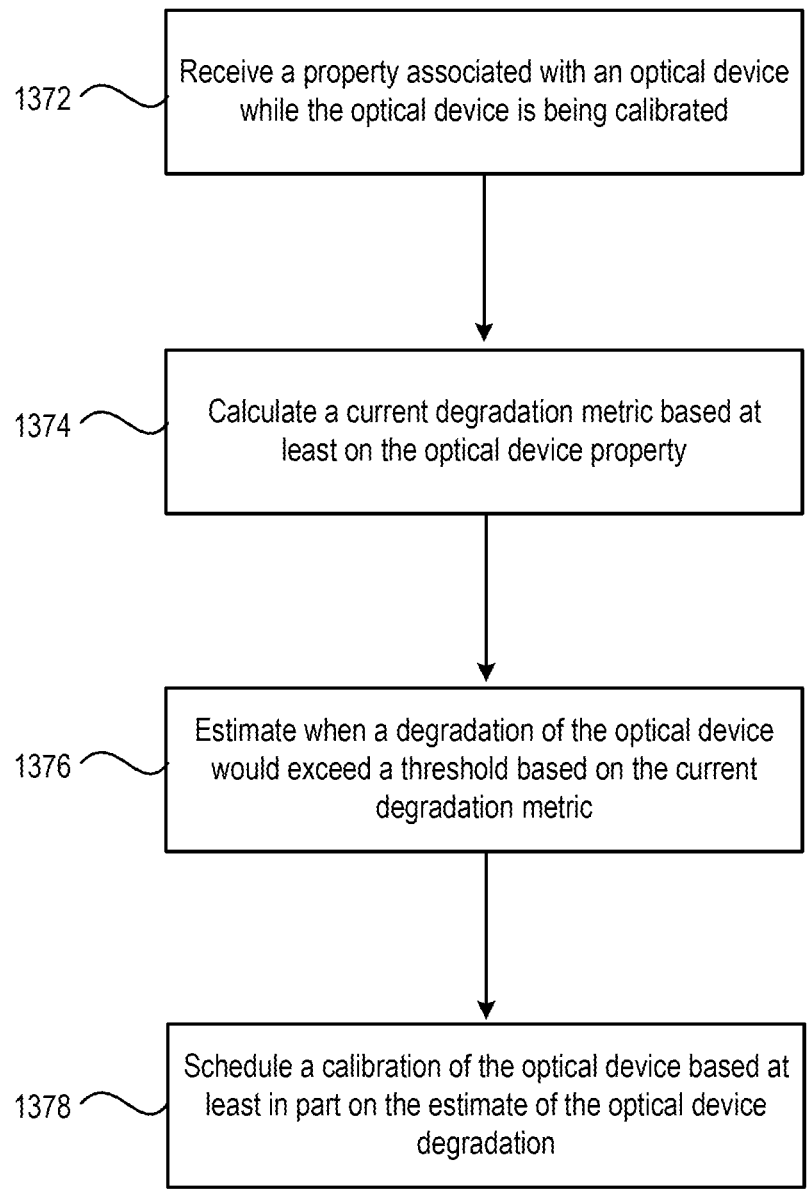
FIG. 13 is a flow chart of a procedure for scheduling a calibration using the optical device and the calibration system of FIG. 12, and optionally using the optical device and the calibration system of FIG. 1 or 5.

Referring to FIG. 13, a procedure 1370 is performed for scheduling a calibration of the optical device 1205. The procedure 1370 is similar to the procedure 770 in that the procedure 770 is one way to perform the procedure 1370. The procedure 1370 is performed by the calibration system 1200. While not discussed, the procedure 1370 can be performed by the calibration system 100 (FIGS. 1 and 2) or the calibration system 500 (FIG. 5).

The procedure 1370 includes receiving a property associated with the optical device 1205 while the optical device 1205 is being calibrated (1372). The optical device property can be received by the input module 232 of the prediction controller 1230 (FIGS. 2 and 12). In some implementations, the calibration control module 1216 provides the optical device property to the input module 232 of the prediction controller 1230. In other implementations, the prediction controller 1230 accesses the optical device property directly from the optical device 1205. In one example, once the prediction controller 1230 detects that a calibration has taken place, it requests the data [data(cal)] associated with the calibration from the optical device 1205. The optical device 1205 provides the data(cal) to the prediction controller 1230. The data(cal) includes the current value of the measurement scale S(i), the value of the measurement offset O, and the number of pulses of the light beam 101 that were produced since the last calibration of the optical device 1205 [UsePredict(i)].

Next, a current degradation metric α(i) is calculated based at least on the optical device property (1374). For example, the adaptive module 234 of the prediction controller 1230 receives the optical device property (which includes the measurement scale S(i)) from the input module 232, and the adaptive module 234 calculates the current degradation metric α(i) based at least on the optical device property. The degradation metric α models the behavior of the optical device 1205. Specifically, the adaptive module 234 can estimate how much the optical device property (the measurement scale S) changes relative to a change in usage of the optical device 1205. In other words, as the optical device 1205 is used over time during operation of the light source 102, the optical device property S can change in value (or drift). This drift in S causes a change in value of the estimated energy E and this drift can be modeled as the degradation metric by the adaptive module 234.

The degradation metric a can correspond to a local linear approximation of the slope of a trend of the measurement scale S. For example, the trend can be a linear trend or a non-linear trend, and the local linear approximation of the slope can be positive or negative when the slope is positive or negative, respectively. In this way, the optical device property is assumed to change in a linear manner relative to a change in usage of the optical device 1205.

Next, the prediction controller 1230 estimates when the degradation of the optical device 1205 would exceed the predetermined threshold MaxErr(S) based on the current degradation metric $\alpha(i)$ (1376), where i corresponds to the most recent (and current) calibration event performed on the optical device 1205. Therefore, i−1 is the calibration event performed on the optical device 1205 that came immediately prior to the calibration event i and i+1 is the next calibration event that will be scheduled by the prediction controller 1230. The adaptive module 234 of the prediction controller 1230 performs an analysis based on the calculated current degradation metric $\alpha$ (from 1374) and estimates when the accuracy of the optical device 1205 would become unacceptable. The prediction controller 1230 schedules a calibration of the optical device 1205 based at least in part on the estimate of the degradation of the optical device 1205 (1378). For example, the adaptive module 234 can schedule the calibration based on the degradation estimate (from 1376) and provide this scheduled event to the output module 236. The adaptive module 234 estimates how many pulses of the light beam 101 can be produced UsePredict(i+1) before the degradation of the optical device 1205 exceeds the threshold MaxErr(S). This estimate can be written as equation:

$$UsePredict(i+1) = \frac{\text{Max}Err(S)}{\alpha(i)} \qquad \text{Equation (9)}$$

As mentioned, at step 1374, the adaptive module calculates the degradation metric $\alpha$, which models the behavior of the optical device 1205. This estimate relies on an assumption that the current degradation metric $\alpha$ corresponds to a local linear approximation of the slope of a trend of the measurement scale S. If the local behavior of the trend of the measurement scale S is not linear, then the calculated degradation metric a may not adequately capture the local behavior of the trend of the measurement scale S. In this case, the adaptive module 234 can adjust how it schedules the calibration of the optical device 1205 so that it takes into account the reliability of the model of the behavior of the optical device 1205.

Figure 14:
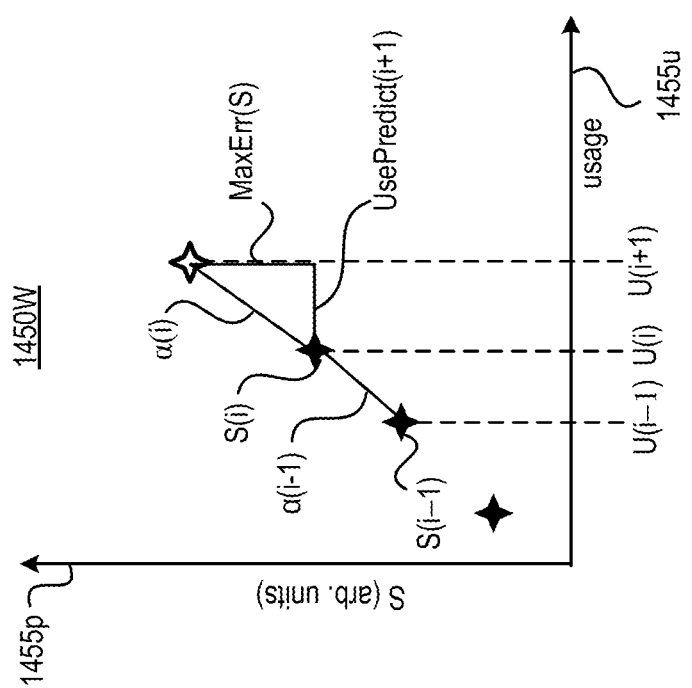
FIG. 14 is a graph showing the operation of the procedure of FIG. 13 and specifically values of the measurement scale of the optical device of FIG. 12 relative to usage of the optical device of FIG. 12 for a local window of usage.

Referring to FIG. 14, in order to show operation of the procedure 1370, values of a measurement scale S of the optical device 1205 are shown relative to usage 1455u for a local window 1450W of usage. In this depiction, the current and most recent calibration event is i and occurs at usage Ui. Moreover, i−1 is the calibration event performed on the optical device 1205 that came immediately prior to the calibration event i, and i+1 is the next calibration event that will be scheduled by the prediction controller 1230. The current degradation metric $\alpha(i)$ provides an estimate of the slope of the measurement scale S in a small usage window that is bounded by the current and most recent calibration event that occurs at usage Ui. The current degradation metric $\alpha(i)$ forms the hypotenuse of a right-angled triangle that assumes the measurement scale S changes in a linear fashion in this small usage window from the value S(i). Depicted in graph form, the usage UsePredict(i+1) is estimated by extending the hypotenuse from the value of the measurement scale S 1455p at the last calibration event i along the calculated slope $\alpha(i)$ by a usage that corresponds to the predetermined threshold MaxErr(S) to form a right-angled triangle.

Next, the adaptive scheme for calculating the current degradation metric $\alpha(i)$ based on the optical device property (step 1374) is described. In the following discussion, the optical device property is the measurement scale S. The last value of the measurement scale S is given by S(i−1).

At initialization of the adaptive scheme, such as when the spectral analysis module 305 is first initiated, and the first calibration corresponds to i=1, the value of the degradation metric is set:as follows:

$$\alpha(1) = \frac{(S(1) - S(0))}{U(1)} \qquad \text{Equation (10)}$$

where U(1) is an initial value of the usage. EstErr is an indication of the reliability of the adaptive scheme being performed for the current calibration event i. EstS is an estimate of the measurement scale S for the current calibration event i. At each iteration, and for a current and most recent calibration event i, the estimated measurement scale EstS(i) is given by Equation 11:

$$\text{Est}S(i)=S(i-1)+\alpha(i-1)*U(i) \qquad \text{Equation (11)}$$

Next, the value for the reliability estimate EstErr(i) for the current and most recent calibration event i is given by Equation 12:

$$\text{EstErr}(i)=S(i)-\text{Est}S(i) \qquad \text{Equation (12)}$$

where S(i) corresponds to the current measurement scale S. The reliability estimate EstErr(i) provides an indication regarding how reliable the local linear approximation is and therefore this reliability estimate EstErr(i) can provide an indication regarding whether the local trend of the measurement scale S can be linearly approximated or whether a linear approximation of the measurement scale S is inadequate (such as near an inflection point). The current degradation metric $\alpha(i)$ is calculated (1374) based on this reliability estimate as:

$$\alpha(i)=\alpha(i-1)-\eta\text{EstErr}(i), \qquad \text{Equation (13)}$$

where $\eta$ is a constant that acts as a gain of a low pass filter. The constant $\eta$ can be selected to be any real value and can be a configurable parameter.

As discussed above, the adaptive module 234 schedules the calibration based on this degradation metric $\alpha(i)$ (1378) by, for example, first estimating how many pulses of the light beam 101 can be produced, UsePredict1(i+1), (1376) according to the equation noted above, and reproduced next as Equation 14:

$$UsePredict1(i+1) = \frac{\text{Max}Err(S)}{\alpha(i)} \qquad \text{Equation (14)}$$

Once the value for UsePredict1(i+1) is estimated (1376), then it can be used to schedule the next calibration (1378), as discussed next.

In some implementations, the next calibration is scheduled (1378) based on the actual value of UsePredict1(i+1); that is, the next calibration is scheduled to occur at the number of pulses determined in UsePredict1(i+1).

In other implementations, the scheduling of the next calibration (1378) takes into account not only the value of UsePredict1(i+1) but also the reliability estimate EstErr(i). For example, a second value of UsePredict2(i+1) can be determined by comparing the reliability estimate EstErr(i) to one or more thresholds Thr (such as Thr1, Thr2, Thr3, Thr4) that are given in units of absolute energy errors (percentages). The values for the thresholds Thr are configurable, and can be modified. In one example, Thr1=2.1%, Thr2=1.4%, Thr3=0.93%, and Thr4=0.6%.

The second value of UsePredict2(i+1) is a decreasing function based on the value of EstErr(i). In one specific implementation, if the absolute value of EstErr(i)>Thr1, then UsePredict2(i+1)=UseValue1, which can be 500 million pulses of the light beam 101. If Thr2<absolute value of EstErr(i)<Thr1, then UsePredict2(i+1)=UseValue2, which can be 1000 million pulses of the light beam 101. If Thr(3)<the absolute value of EstErr(i)<Thr(2), then UsePredict3(i+1)=UseValue3, which can be 2000 million pulses of the light beam. If Thr(4)<the absolute value of EstErr(i)< Thr(3), then UsePredict4 (i+1)=UseValue4, which can be 4000 million pulses of the light beam. If Thr(5)<the absolute value of EstErr(i)<Thr(4), then UsePredict5(i+1)= UseValue5, which can be 6000 million pulses of the light beam. The next calibration is scheduled by determining the minimum value between UsePredict1(i+1) and UsePredict2(i+1).

In this way, the output module 236 determines when to perform the next or subsequent calibration of the optical device 1205. The output module 236 can instruct the calibration apparatus 1210 to calibrate the optical device 1205 based on this schedule. As such, the prediction controller 1230 determines when the subsequent calibration of the optical device 1205 should advantageously be scheduled, and communicates with the calibration apparatus 1210 to calibrate the optical device 1205 when the calibration is needed. Moreover, the optical device 1205 is not calibrated when the optical device 1205 does not need to be calibrated, thereby decreasing the amount of time during which the optical device 1205 is inoperable (during calibration).

Figure 15:
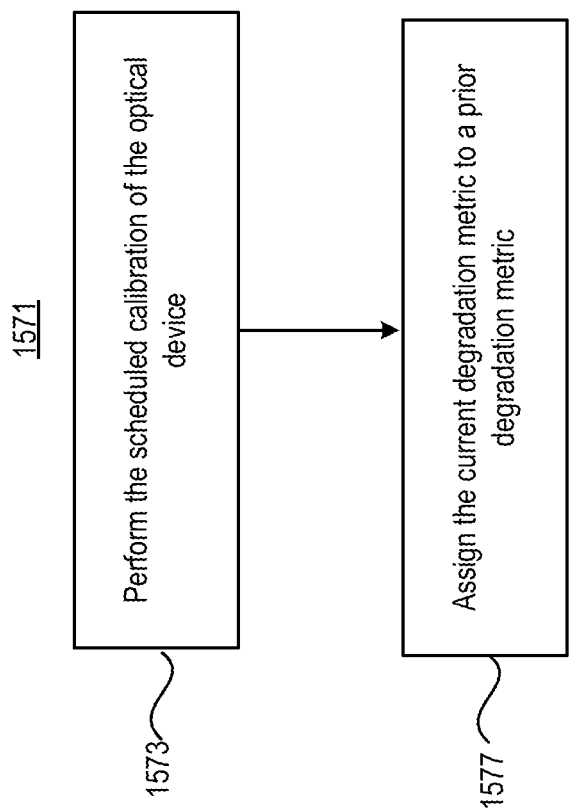
FIG. 15 is a flow chart of a procedure that is performed after scheduling the calibration relating to the optical device of FIG. 12 using the procedure of FIG. 13.

Referring also to FIG. 15, a procedure 1571 is performed after scheduling the calibration of the optical device 1205 at step 1378 of the procedure 1370. After the next calibration of the optical device 1205 is scheduled (1378), the output module 236 of the prediction controller 1230 sends an instruction to the calibration apparatus 1210 regarding when to perform the next calibration (1573). Moreover, the current degradation metric α(i) is assigned to the prior degradation metric α(i−1) and other variables in the adaptive scheme discussed above can be updated as well (1577). The current degradation metric α(i) that is associated with this next calibration can then be calculated as an updated metric, for example, using the procedure 1370.

In other implementations, some of the components within the calibration system 1200 can be integrated with some of the components of other calibration systems discussed above. For example, some of the components are dedicated for use with the energy analysis module 1205 while other of the components are dedicated for use with other optical devices such as the spectral analysis module 305.

In other implementations, the calibration apparatus 1210 can include an optical energy meter instead of the power meter 1214, the optical energy meter measuring the actual energy of a pulse of the light beam 101.

The implementations and/or embodiments can be further described using the following clauses:

1. A method for scheduling a calibration relating to an optical device in a light source, the method comprising:
   receiving a property associated with the optical device while the optical device is being calibrated;
   calculating a current degradation metric based at least on the optical device property, the degradation metric modeling behavior of the optical device;
   estimating when a degradation of the optical device would exceed a threshold based on the current degradation metric; and
   scheduling a calibration of the optical device based at least in part on the estimate of optical device degradation.
2. The method of clause 1, wherein the scheduling the calibration of the optical device based on the estimate comprises determining when to perform a calibration of the optical device.
3. The method of clause 1, wherein the calculating the current degradation metric is based on a calibration property.
4. The method of clause 1, wherein the optical device is configured to measure a spectral feature of a light beam produced by the light source.
5. The method of clause 4, wherein the measured spectral feature of the light beam is a wavelength of the light beam.
6. The method of clause 1, wherein the receiving the optical device property while the optical device is being calibrated comprises receiving an error measurement associated with a spectral feature of the light beam produced by the light source while the optical device is being calibrated.
7. The method of clause 6, wherein the error measurement is a difference between a measured spectral feature of the light beam and a reference spectral feature.
8. The method of clause 1, wherein the calculating the current degradation metric based at least on the optical device property comprises estimating how much the optical device property changes relative to a change in usage of the optical device.
9. The method of clause 8, wherein the estimating how much the optical device property changes relative to the change in usage of the optical device comprises estimating an error that is based on data related to a prior value of the optical device property and a prior degradation metric.
10. The method of clause 1, wherein the calculating the current degradation metric based at least on the optical device property comprises assuming that the optical device property changes in a linear manner relative to a change in usage of the optical device.
11. The method of clause 1, wherein the calculating the current degradation metric based on the optical device property comprises estimating an error in the optical device property based on a linear function in which a prior degradation metric is a slope of the linear function, the linear function including a prior value of the usage of the optical device and a cumulative summation of the error in the optical device property.

12. The method of clause 11, wherein the calculating the current degradation metric based on the optical device property comprises estimating an error in the optical device property.
13. The method of clause 1, wherein the calculating the current degradation metric based at least on the optical device property comprises analyzing how the optical device property is trending.
14. The method of clause 1, wherein the degradation metric models trending behavior of the optical device.
15. The method of clause 1, wherein the scheduling the calibration of the optical device based on the estimate comprises probing whether the optical device property changes in a non-linear manner relative to a usage of the optical device.
16. The method of clause 15, wherein the probing whether the optical device property changes in a non-linear manner relative to the usage of the optical device comprises analyzing a confidence in the current degradation metric.
17. The method of clause 1, wherein the estimating when the degradation of the optical device would exceed a threshold comprises estimating when an error in the optical device property exceeds a threshold.
18. The method of clause 1, wherein the scheduling the calibration of the optical device based on the estimate comprises estimating an amount of additional usage of the optical device that would be acceptable before requiring the calibration.
19. The method of clause 1, further comprising, after the scheduling the calibration of the optical device, updating the optical device property when the next calibration that is scheduled is performed and assigning the current degradation metric to a prior degradation metric.
20. The method of clause 1, wherein the degradation metric corresponds to a local linear approximation of the slope of the optical device property.
21. The method of clause 1, wherein optical device is configured to estimate an energy of a light beam produced by the light source.
22. The method of clause 1, wherein the receiving the optical device property while the optical device is being calibrated comprises receiving a measurement scale associated with the optical device performing a conversion from a direct measurement to an indirect value, the direct measurement relating to the light beam produced by the light source while the optical device is being calibrated.
23. The method of clause 22, wherein estimating when the degradation of the optical device would exceed the threshold comprises estimating when a drift in the optical device property would exceed a drift threshold.
24. The method of clause 23, wherein estimating when the drift in the optical device property would exceed the drift threshold comprises calculating the drift threshold based on an error threshold associated with indirect value.
25. A calibration system comprising:
a calibration apparatus configured to calibrate an optical device configured to measure an aspect relating to a light beam produced by a light source; and
a prediction controller in communication with the calibration apparatus, the prediction controller comprising:
an input module configured to receive from the optical device a measured property associated with the measured aspect of the light beam while the optical device is being calibrated;
an adaptive module configured to: receive the measured property from the input module; calculate a current degradation metric based at least on the measured property, the degradation metric modeling behavior of the optical device; and estimate when a degradation of the optical device would exceed a threshold based on the current degradation metric; and
an output module configured to schedule a calibration of the optical device based on the estimate from the adaptive module; and instruct the calibration apparatus to calibrate the optical device based on the schedule.
26. The calibration system of clause 25, wherein the measured property associated with the optical device comprises a measurement of a spectral feature of a light beam produced by the light source.
27. The calibration system of clause 25, wherein the calibration apparatus comprises a calibration material having an optical transition profile with a known energy transition.
28. The calibration system of clause 27, wherein the optical device comprises a spectral analysis module configured to sense a spectral profile of a light beam produced by a light source, and the calibration apparatus is configured to calibrate the spectral analysis module using the calibration material.
29. The calibration system of clause 28, wherein the estimate of the degradation of the optical device is an indication of a drift in the calibration of the spectral analysis module.
30. The calibration system of clause 28, wherein the calibration apparatus being configured to calibrate the optical device comprises adjusting one or more operating parameters of the spectral analysis module.
31. The calibration system of clause 25, wherein the degradation metric corresponds to a local linear approximation of the slope of a trend of the measured property.
32. A prediction apparatus in communication with a calibration apparatus configured to calibrate an optical device configured to measure an aspect relating to a light beam produced by a light source, the prediction apparatus comprising:
an input module configured to receive from the optical device a measured property associated with the measured aspect of the light beam while the optical device is being calibrated;
an adaptive module configured to: receive the measured property from the input module; calculate a current degradation metric based at least on the measured property, the degradation metric modeling behavior of the optical device; and estimate when a degradation of the optical device would exceed a threshold based on the current degradation metric; and
an output module configured to schedule a calibration of the optical device based on the estimate from the adaptive module; and instruct the calibration apparatus to calibrate the optical device based on the schedule.
33. A calibration system comprising:
a calibration apparatus configured to calibrate an optical device configured to measure an aspect relating to a light beam produced by a light source; and
a prediction controller in communication with the calibration apparatus, the prediction controller comprising:

an input module configured to receive from the optical device a property associated with the optical device while the optical device is being calibrated;

calculate a current degradation metric based at least on the optical device property, the degradation metric modeling behavior of the optical device; and estimate when a degradation of the optical device would exceed a threshold based on the current degradation metric; and an output module configured to schedule a calibration of the optical device based on the estimate from the adaptive module; and instruct the calibration apparatus to calibrate the optical device based on the schedule.

34. The calibration system of clause 33, wherein the optical device is configured to provide an estimate of an energy of the light beam based on a measurement scale.

35. The calibration system of clause 34, wherein the optical device property comprises the measurement scale.

36. The calibration system of clause 34, wherein the measurement scale enables a conversion from a direct measurement of characteristic of the light beam to an indirect value of the energy of the light beam.

37. The calibration system of clause 34, wherein the calibration apparatus comprises:

a power meter that receives at least a portion of the light beam that is directed to the optical device, the power meter outputting a measured power;

a processor configured to:

calculate an energy in a pulse of the light beam based on a pulse repetition rate of the light source and the measured power output from the power meter; and compare the accurately calculated energy with the estimated energy of the light beam from the optical device.

38. The calibration system of clause 37, wherein the processor is configured to estimate a drift in the measurement scale of the optical device based on the comparison.

39. The calibration system of clause 38, wherein the calibration apparatus being configured to calibrate the optical device comprises adjusting the measurement scale of the optical device based on the comparison.

40. The calibration system of clause 38, wherein the degradation of the optical device is indicated by the estimate of the drift in the measurement scale of the optical device.

41. The calibration system of clause 34, wherein the degradation metric corresponds to a local linear approximation of the slope of a trend of the measurement scale of the optical device.

42. A prediction apparatus in communication with a calibration apparatus configured to calibrate an optical device configured to measure an aspect relating to a light beam produced by a light source, the prediction apparatus comprising:

an input module configured to receive from the optical device a property associated with the optical device while the optical device is being calibrated;

calculate a current degradation metric based at least on the optical device property, the degradation metric modeling behavior of the optical device; and estimate when a degradation of the optical device would exceed a threshold based on the current degradation metric; and an output module configured to schedule a calibration of the optical device based on the estimate from the adaptive module; and instruct the calibration apparatus to calibrate the optical device based on the schedule.

The invention claimed is:

1. A method for calibrating an optical device in a light source, the method comprising:

measuring a property associated with the optical device while the optical device is being calibrated;

calculating a current degradation metric based at least on the measured optical device property, the degradation metric modeling behavior of the optical device;

estimating when a degradation of the optical device would exceed a threshold based on the current degradation metric;

scheduling a calibration of the optical device based at least in part on the estimate of optical device degradation; and calibrating the optical device based on the scheduling.

2. The method of claim 1, wherein the scheduling the calibration of the optical device based on the estimate comprises determining when to perform the calibration of the optical device.

3. The method of claim 1, wherein the calculating the current degradation metric is based on a calibration property.

4. The method of claim 1, wherein the optical device is configured to measure a spectral feature of a light beam produced by the light source.

5. The method of claim 1, wherein the measuring the optical device property while the optical device is being calibrated comprises measuring an error associated with a measurement of a feature of the light beam produced by the light source.

6. The method of claim 5, wherein the feature of the light beam produced by the light source is a spectral feature of the light beam produced by the light source, a center wavelength of the light beam produced by the light source, or an energy of the light beam produced by the light source.

7. The method of claim 1, wherein the calculating the current degradation metric based at least on the optical device property comprises estimating how much the optical device property changes relative to a change in usage of the optical device.

8. The method of claim 7, wherein the estimating how much the optical device property changes relative to the change in usage of the optical device comprises estimating an error that is based on data related to a prior value of the optical device property and a prior degradation metric.

9. The method of claim 1, wherein the calculating the current degradation metric based on the optical device property comprises estimating an error in the optical device property based on a linear function in which a prior degradation metric is a slope of the linear function, the linear function including a prior value of the usage of the optical device and a cumulative summation of the error in the optical device property.

10. The method of claim 1, wherein the degradation metric models trending behavior of the optical device.

11. The method of claim 1, wherein the scheduling the calibration of the optical device based on the estimate comprises probing whether the optical device property changes in a non-linear manner relative to a usage of the optical device.

12. The method of claim 1, further comprising, after the scheduling the calibration of the optical device, updating the optical device property when the next calibration that is scheduled is performed and assigning the current degradation metric to a prior degradation metric.

13. The method of claim 1, wherein the optical device property comprises a measurement scale associated with the optical device performing a conversion from a direct measurement to an indirect value, the direct measurement relating to the light beam produced by the light source.

14. The method of claim 1, wherein estimating when the degradation of the optical device would exceed the threshold comprises estimating when a drift in the optical device property would exceed a drift threshold.

15. A prediction apparatus comprising:
an input module configured to receive from an optical device a measured property associated with a measured aspect of a light beam, the measured property measured while the optical device is being calibrated;
an adaptive module configured to: receive the measured property from the input module; calculate a current degradation metric based at least on the measured property, the degradation metric modeling behavior of the optical device; and estimate when a degradation of the optical device would exceed a threshold based on the current degradation metric; and
an output module configured to schedule a calibration of the optical device based on the estimate from the adaptive module and to provide instructions to calibrate the optical device based on the schedule.

16. The prediction apparatus of claim 15, wherein the output module is further configured to determine when to perform a calibration of the optical device.

17. The prediction apparatus of claim 15, wherein the adaptive module is further configured to calculate a current degradation metric based on a calibration property.

18. The prediction apparatus of claim 15, wherein the input module is configured to receive from the optical device the measured property associated with the measured aspect of the light beam by receiving an error measurement associated with a feature of the light beam produced by the light source; the feature of the light beam being a spectral feature, a center wavelength, or an energy of the light beam.

19. The prediction apparatus of claim 15, wherein the adaptive module is configured to:
calculate the current degradation metric based at least on the measured property by estimating how much the optical device property changes relative to a change in usage of the optical device; and
estimate how much the optical device property changes relative to the change in usage of the optical device by estimating an error that is based on data related to a prior value of the optical device property and a prior degradation metric.

20. The prediction apparatus of claim 15, wherein the adaptive module is configured to calculate the current degradation metric based at least on the measured property by estimating an error in the optical device property based on a linear function in which a prior degradation metric is a slope of the linear function, the linear function including a prior value of the usage of the optical device and a cumulative summation of the error in the optical device property.

21. The prediction apparatus of claim 15, wherein the output module is configured to:
schedule the calibration of the optical device based on the estimate from the adaptive module by probing whether the optical device property changes in a non-linear manner relative to a usage of the optical device; and after scheduling the calibration of the optical device, update the optical device property when the next calibration that is scheduled is performed, and assign the current degradation metric to a prior degradation metric.

22. The prediction apparatus of claim 15, wherein the measured property comprises a measurement scale associated with the optical device performing a conversion from a direct measurement to an indirect value, the direct measurement relating to the light beam produced by the light source.

23. The prediction apparatus of claim 15, wherein the calibration apparatus comprises a calibration material.

24. A calibration system comprising:
a calibration apparatus configured to calibrate an optical device configured to measure an aspect relating to a light beam produced by a light source; and a prediction controller in communication with the calibration apparatus, the prediction controller comprising:
an input module configured to receive from the optical device a measured property associated with the optical device measured while the optical device is being calibrated;
an adaptive module configured to: receive the measured property from the input module; calculate a current degradation metric based at least on the measured property, the degradation metric modeling behavior of the optical device; and estimate when a degradation of the optical device would exceed a threshold based on the current degradation metric; and
an output module configured to: schedule a calibration of the optical device based on the estimate from the adaptive module; and instruct the calibration apparatus to calibrate the optical device based on the schedule.

25. The calibration system of claim 24, wherein the optical device is configured to provide an estimate of an energy of the light beam based on a measurement scale.

26. The calibration system of claim 25, wherein the calibration apparatus comprises:
a power meter that receives at least a portion of the light beam that is directed to the optical device, the power meter outputting a measured power;
a processor configured to:
calculate an energy in a pulse of the light beam based on a pulse repetition rate of the light source and the measured power output from the power meter; and
compare the accurately calculated energy with the estimated energy of the light beam from the optical device.

27. The calibration system of claim 26, wherein the processor is configured to estimate a drift in the measurement scale of the optical device based on the comparison.

28. The calibration system of claim 27, wherein the degradation of the optical device is indicated by the estimate of the drift in the measurement scale of the optical device.

29. The calibration system of claim 25, wherein the degradation metric corresponds to a local linear approximation of the slope of a trend of the measurement scale of the optical device.

30. The calibration system of claim 24, wherein the calibration apparatus comprises a calibration material.

* * * * *